United States Patent
Bhattacharya et al.

(10) Patent No.: US 10,783,160 B2
(45) Date of Patent: Sep. 22, 2020

(54) SYSTEM AND METHOD FOR SCALABLE DISTRIBUTED REAL-TIME DATA WAREHOUSE

(71) Applicant: Futurewei Technologies, Inc., Plano, TX (US)

(72) Inventors: Debashis Bhattacharya, Plano, TX (US); Alan Gatherer, Richardson, TX (US); Alex Elisa Chandra, Plano, TX (US); Mark Brown, Little Elm, TX (US); Hao Luan, Plano, TX (US); Ashish Rai Shrivastava, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 788 days.

(21) Appl. No.: 15/264,095

(22) Filed: Sep. 13, 2016

(65) Prior Publication Data
US 2017/0103076 A1    Apr. 13, 2017

Related U.S. Application Data

(60) Provisional application No. 62/239,641, filed on Oct. 9, 2015.

(51) Int. Cl.
*G06F 16/25* (2019.01)
*G06F 16/28* (2019.01)
*G06F 13/40* (2006.01)
*G06F 15/78* (2006.01)

(52) U.S. Cl.
CPC ........ *G06F 16/252* (2019.01); *G06F 13/4022* (2013.01); *G06F 15/7814* (2013.01); *G06F 16/254* (2019.01); *G06F 16/283* (2019.01)

(58) Field of Classification Search
USPC ........................................ 707/602
See application file for complete search history.

(56) References Cited

U.S. PATENT DOCUMENTS

| | | |
|---|---|---|
| 4,386,399 A | 5/1983 | Rasala et al. |
| 8,619,800 B1 | 12/2013 | Finney et al. |
| 9,135,581 B1 | 9/2015 | Beckford |
| 2002/0191692 A1* | 12/2002 | Fallon et al. .......... H03M 7/30 375/240 |
| 2003/0033495 A1* | 2/2003 | Lawman ............. G06F 21/6218 711/163 |

(Continued)

FOREIGN PATENT DOCUMENTS

| | | |
|---|---|---|
| CN | 101004727 A | 7/2007 |
| CN | 101212451 A | 7/2008 |

(Continued)

OTHER PUBLICATIONS

"Open Event Machine: Introduction," Rev 1.0, May 2013, 39 pgs.

*Primary Examiner* — Muluemebet Gurmu
(74) *Attorney, Agent, or Firm* — Slater Matsil, LLP

(57) ABSTRACT

A computation system-on-a-chip (CSoC) includes a first scalable distributed real-time Data Warehousing (sdrDW) engine and a network interface coupled to the first sdrDW engine, where the network interface is coupled to an interconnect, and where the CSoC is configured to transmit a task request over the interconnect to a first networked bulk storage controller (NBSC) requesting that a task be performed on a bulk storage medium.

31 Claims, 12 Drawing Sheets

(56) References Cited

U.S. PATENT DOCUMENTS

| | | | |
|---|---|---|---|
| 2003/0140123 A1 | 7/2003 | Master et al. | |
| 2003/0142105 A1 | 7/2003 | Lavelle et al. | |
| 2004/0064682 A1 | 4/2004 | Nguyen et al. | |
| 2004/0136241 A1 | 7/2004 | Rapp et al. | |
| 2005/0025169 A1 | 2/2005 | Douady et al. | |
| 2007/0083771 A1* | 4/2007 | Chen | G06F 12/14 713/193 |
| 2010/0070718 A1* | 3/2010 | Pong | G06F 12/08 711/141 |
| 2010/0235562 A1* | 9/2010 | Gaither | G06F 12/02 711/102 |
| 2011/0289270 A1 | 11/2011 | Bell, Jr. et al. | |
| 2013/0054546 A1 | 2/2013 | Solihin | |
| 2013/0304693 A1 | 11/2013 | Jaeger et al. | |
| 2014/0149355 A1* | 2/2014 | Gupta | G06F 17/30 707/652 |
| 2014/0180675 A1 | 6/2014 | Neuhauser et al. | |
| 2014/0351826 A1 | 11/2014 | Llamas | |
| 2014/0372699 A1 | 12/2014 | Desai et al. | |
| 2015/0205845 A1 | 7/2015 | Ocher | |
| 2015/0347542 A1 | 12/2015 | Sullivan et al. | |
| 2016/0103707 A1 | 4/2016 | Bhattacharya et al. | |
| 2016/0242142 A1 | 8/2016 | Boyette et al. | |
| 2017/0017394 A1 | 1/2017 | Wang et al. | |
| 2017/0103093 A1 | 4/2017 | Chandra et al. | |

FOREIGN PATENT DOCUMENTS

| | | |
|---|---|---|
| CN | 102662994 A | 9/2012 |
| CN | 103106174 A | 5/2013 |
| EP | 2312463 A1 | 4/2011 |
| WO | 2007056343 A2 | 5/2007 |
| WO | 2012146471 A1 | 11/2012 |
| WO | 2013048929 A1 | 4/2013 |

* cited by examiner

SYSTEM AND METHOD FOR SCALABLE DISTRIBUTED REAL-TIME DATA WAREHOUSE

CROSS-REFERENCE TO RELATED APPLICATIONS

This application claims the benefit of U.S. Provisional Application No. 62/239,641, filed on Oct. 9, 2015, which application is hereby incorporated herein by reference.

TECHNICAL FIELD

The present invention relates generally to a system and method for data warehouses and, in particular embodiments, to a system and method for scalable distributed real-time data warehouses.

BACKGROUND

In some situations, bulk storage media may be used inefficiently, with a significant amount of memory containing old data sitting idle that cannot be reused. Bulk storage media includes off system-on-a-chip (SoC) memory, such as double data rate (DDR) memory and flash memory, and large, on SoC memory storage, such as synchronous dynamic random access memory (SRAM) or embedded dynamic random access memory (DRAM). The on SoC memory storage may be accessed by multiple compute engines and/or data management engines on the SoC. Bulk storage media may be used to simply hold bits of data. In bulk storage media, all bits may be treated similarly, being first written to, and possibly later read out. Data may be multiply buffered to meet real-time throughput and latency constraints during processing, leading to significant power and area usage. Global memory maps of all available bulk storage media and organizations may be used by some technologies. Also, in bulk storage media, the location of data may be statically determined. Manual optimization of memory usage via overlays of data may be used in real-time embedded systems. However, manual optimization may be difficult and time consuming to create, and may lead to poor code reuse properties. Optimizing bulk storage media in advance may be problematic, because the memory usage pattern may not be known in advance. Also, updating bulk storage media may be expensive. Additionally, global memory mapping may lead to gaps in the address space, implying inefficient utilization of on-SoC memory and/or bulk storage media.

A data warehouse (DW), real-time data warehouse (rDW), and scalable distributed real-time data warehouse (sdrDW) are logical abstractions of data management used by real-time systems, such as baseband processing, to manage bulk storage media. An sdrDW facilitates smart and efficient management of data movement and dynamic data reorganization of baseband processing in a SoC.

SUMMARY

In accordance with a preferred embodiment of the present invention, a computation system-on-a-chip (CSoC) includes a first scalable distributed real-time Data Warehousing (sdrDW) engine and a network interface coupled to the first sdrDW engine, where the network interface is coupled to an interconnect, and where the CSoC is configured to transmit a task request over the interconnect to a first networked bulk storage controller (NBSC) requesting that a task be performed on a bulk storage medium.

An embodiment networked bulk storage controller (NBSC) includes a network interface coupled to an interconnect, where the network interface is configured to receive a task request from a first computation system-on-a-chip (CSoC) over the interconnect, where the task request indicates a task. The NBSC also includes a bulk storage media interface coupled to the network interface, where the bulk storage media interface is configured to perform the task on bulk storage media.

An embodiment method includes receiving, by a computation system-on-a-chip (CSoC), a task request and transmitting, by the CSoC to a networked bulk storage controller (NBSC) over an interconnect, the task request. The method also includes receiving, by the CSoC from the NBSC over the interconnect, a task response, where the task response and the task request correspond to a task.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
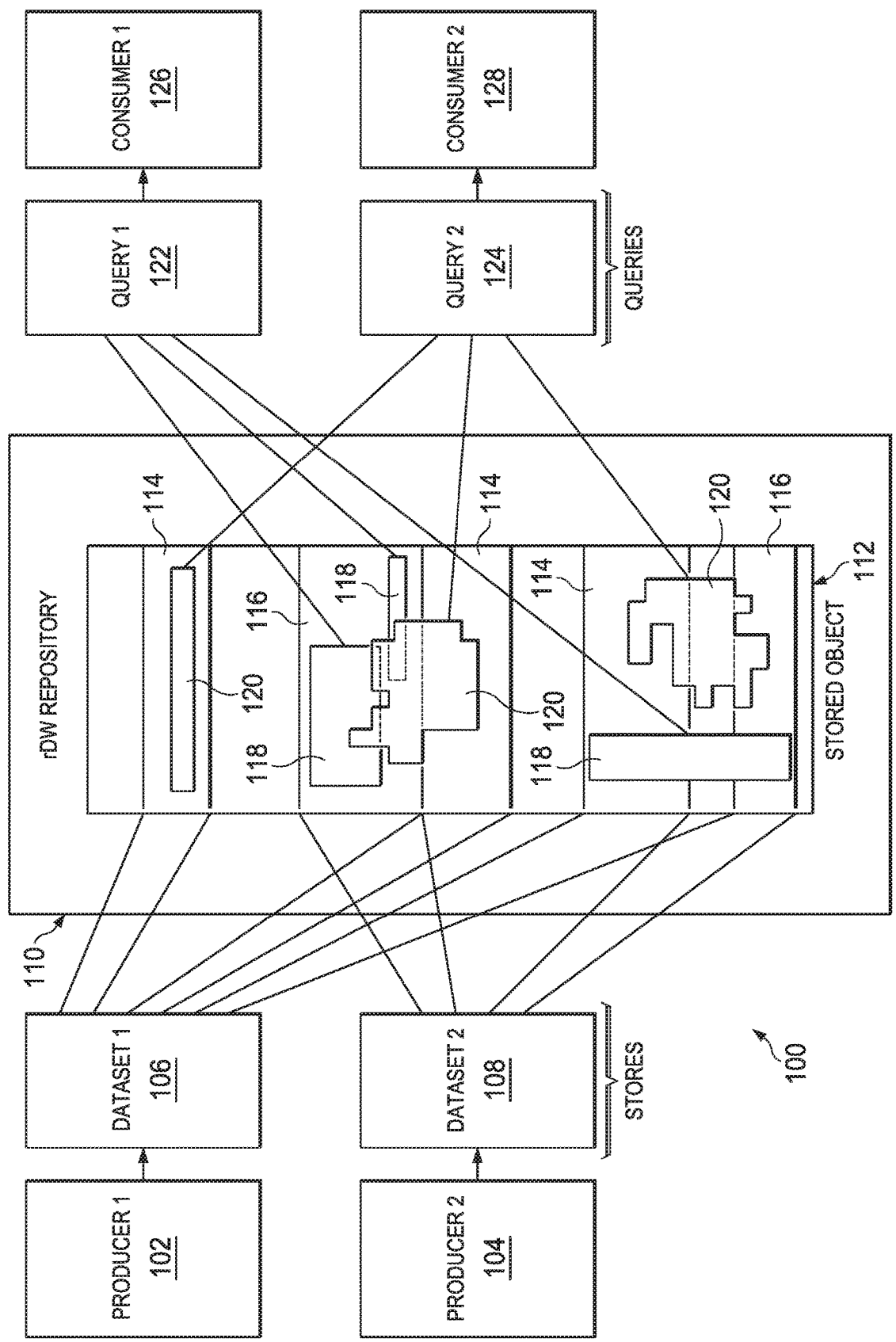
FIG. 1 illustrates an embodiment real-time Data Warehousing (rDW) system.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Memory may include bulk storage media and on-computation system-on-a-chip (CSoC) memory. There are significant challenges and issues for bulk storage media in real-time systems. The amount of data to be stored is growing. For example, a significant amount of data is stored in memory on baseband processing (BB) boards external to the BB systems-on-a-chip (SoCs) present on the boards, where the memory is collectively designated as bulk storage media. The cost of bulk storage media, such as double data rate (DDR) synchronous dynamic access memory (SDRAM) chips, is a significant portion of BB board costs. The cost, in terms of area and power, of interfaces to bulk storage media, for example one or more DDR SDRAM interface on a BB SoC, may be prohibitive. There are costs to placing the DDR SDRAM chips on the board, and for providing appropriate cooling mechanisms, such as air flow, for these chips. The DDR SDRAM chips which are available may be larger in capacity than necessary to achieve the desired throughput for the BB board. In addition, the DDR interfaces on the BB SoCs may consume significant amounts of power and packaging real estate. For example, 250 mW power may be used per 8-bits for a $DDR_3$ physical layer (PHY) interface on a BB SoC, and the DDR interface may take up one or more sides of the packaging for a BB SoC. In addition, bulk storage memory chips cause significant challenges for BB SoC board layout.

There may be multiple SoCs accessing each DDR SDRAM chip on a BB board, which may lead to coupling and/or congestion problems. Baseband processing for a single channel or link, such as a physical uplink shared channel (PUSCH) or a physical uplink control channel (PUCCH), may be spread across multiple SoCs due to increasing computation requirements, especially as wireless standards evolve to fifth generation (5G) and beyond. There may be many antennas, where data from the antennas may be shared across multiple SoCs to handle a single channel or link. It may be desirable to have multiple DDR SDRAM chips per SoC, but there may be insufficient pins to connect a BB SoC to two or more sets of 64-bit DDR SDRAM chips.

A real-time Data Warehouse (rDW) involves bulk storage media with well-defined interfaces. Unlike addressable bulk storage media, these interfaces do not use addresses for actual location inside the bulk storage media. Additional details on real-time data warehouses are discussed in U.S. patent application Ser. No. 14/800,354 filed on Jul. 15, 2015, and entitled "System and Method for Data Warehouse and Fine Granularity Scheduling for System on Chip (SoC)," which application is hereby incorporated herein by reference. Additional details on rDWs are discussed in U.S. patent application Ser. No. 15/169,094 filed on May 31, 2016, and entitled "System and Method for Real-Time Data Warehousing," which application is hereby incorporated herein by reference.

It is desirable to scale an rDW for baseband processing to multiple SoCs, where one logical rDW manages both on SoC storage and off SoC storage. In an embodiment, bulk storage media are centralized using a network interface, which may lead to a network storage architecture having a network server. In an embodiment, storage is decoupled from computation.

FIG. 1 illustrates the rDW system 100, which includes the rDW repository no for storing stored objects 112. Data is produced by producers, including producer 102 and producer 104. Two producers are pictured, but many more producers may be used. Different producers may be different compute engines which produce data in different formats. The compute engines may be software programmable processors or hardware accelerators. For example, each producer may produce data in a format which is most efficient for that producer. Producer 102 stores dataset 106, which is scattered or spread for storage, in stored objects 112 in the rDW repository 110 in form of objects 114. Similarly, data produced by producer 104 is stored in dataset 108 using scattering or spreading in the form of storage objects 116. The data does not need to be stored in a two-dimensional (or n-dimensional) table, and may be stored in one or more arbitrary shapes corresponding to one or more general data structures. Objects produced by a single producer may be stored in different areas of stored objects 112. In one example, data produced by different producers may be adjacent, but non-overlapping.

The objects are read out from stored objects 112 of the rDW repository no by different consumers. Different consumers may use data in formats which are different than both the formats of the producers and the formats used by other consumers. For example, each consumer may read out data in a format which is best suited for itself. The data which is read by a particular consumer originates from different producers. Objects read by different consumers may overlap in stored objects 112. Stored objects 118 are gathered and aggregated by query 122 for consumer 126, and stored objects 120 are gathered and aggregated by query 124 for consumer 128. Data may be read out in parallel by different consumers. The stored objects which are read out from the rDW repository no may have an arbitrary format or shape.

Figure 2:
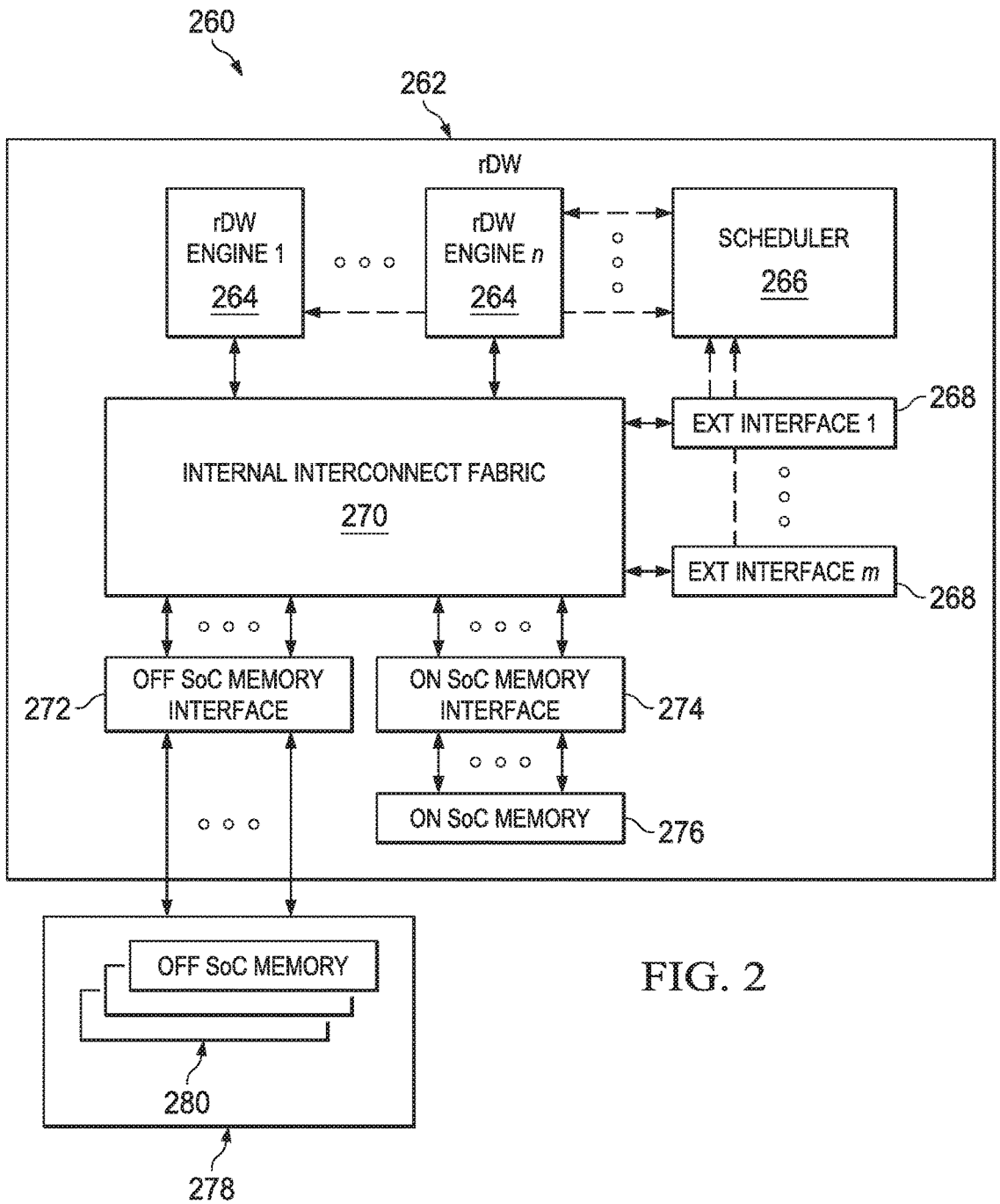
FIG. 2 illustrates another embodiment rDW system.

FIG. 2 illustrates hardware architecture 260 for an example rDW system. Hardware architecture 260 includes the rDW 262 and the off SoC memory 278. The rDW 262 includes the rDW engines 264, which include n rDW engines. The rDW engines 264 communicate with the scheduler 266, which performs scheduling for the rDW engines 264. The scheduler 266 receives store and query requests via the external interfaces 268. The scheduler 266 receives the store and query requests via external interfaces 268. Scheduler 266 receives the store and query requests and decides on the order to perform stores and queries. There are m external interfaces 268. The rDW engines 264 and the external interfaces 268 each communicate with the internal interconnect fabric 270. The internal interconnect fabric 270 interfaces with the off SoC memory interface 272 and the on SoC memory interface 274. There may be multiple off SoC memory interfaces and/or multiple on SoC memory interfaces. The on SoC memory interface 274 interacts with the on SoC memory 276, which may be front side storage (FSS). Also, the off SoC memory interface 272 communicates with the off SoC memory 278. The off SoC memory interface 272 prepares the data for storage. Additionally, the off SoC memory 278 may include multiple bulk storage media 280. A scalable distributed real-time Data Warehouse (sdrDW) is a logical storage management entity for real-time systems which services one or more CSoCs accessing bulk storage media. Implementation of an sdrDW may physically span multiple CSoCs which are connected by a packet network or interconnect with high speed physical links. The sdrDW may use an organization similar to software defined networking (SDN) for a real-time storage system with multiple SoCs. An sdrDW may expand on the handling of service level agreements (SLAs) from rDW for data storage and retrieval transactions within CSoCs and across multiple CSoCs. A compute module requests data by a deadline, without knowing details about the storage, and the sdrDW guarantees the delivery of the data. In an embodiment, an sdrDW enables the decoupling of bulk storage media, compute, and interconnect, facilitating flexible configurations of compute, interconnect, and storage.

Figure 3:
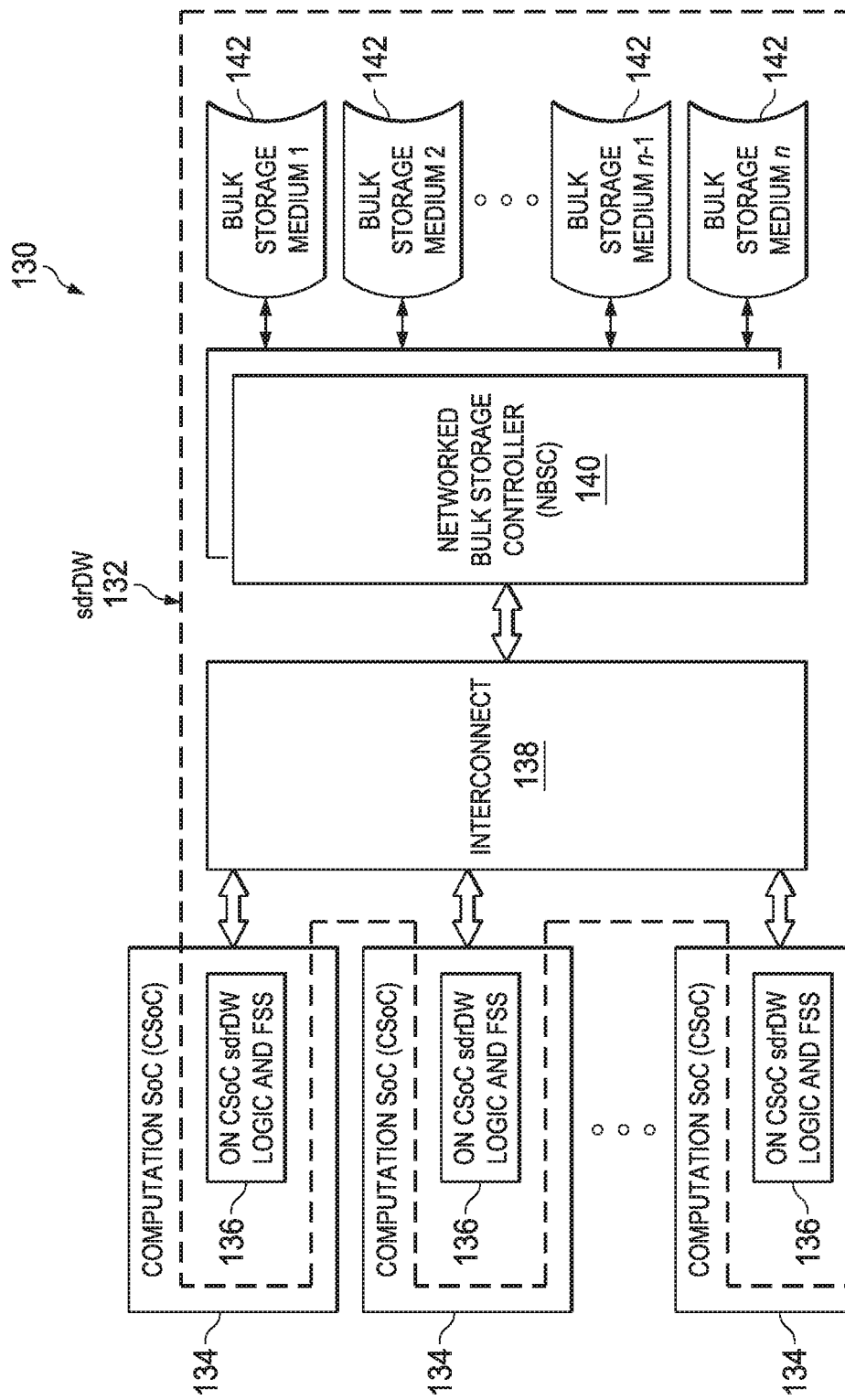
FIG. 3 illustrates an embodiment scalable distributed real-time Data Warehousing (sdrDW) system.

FIG. 3 illustrates a real-time system 130, which includes the sdrDW 132. The CSoCs 134 include the on-CSoC sdrDW logic and FSS 136. Also, the CSoCs 134 include elements which are not part of the sdrDW, such as computational modules and memory. Logical sdrDW functionality in a CSoC may physically span the on-CSoC FSS, as well as off-CSoC logic and the bulk storage media 142 managed by the networked bulk storage controller (NBSC) 140. The on-CSoC logic may include algorithmic techniques to reduce the volume of data transmitted over the network and over memory interfaces, for example using compression or other coding techniques which may reduce the data volume stored in the bulk storage media. Also, the on-CSoC logic for the sdrDW may include algorithmic techniques to enhance robustness and integrity of data, such as error correcting code (ECC). Additionally, algorithmic techniques may be employed to perform encryption to improve security. In one example, an algorithm combines compression and security, where some of the data is stored locally in the CSoC, and not in bulk storage media. The on CSoC stored data is later used for decoding and recovering the original data.

Also, in sdrDW, the storage and retrieval of data may be scheduled. Queries are scheduled to optimize access to data in bulk storage media. Data retrieval may be scheduled for a future time when the data will be available and needed.

The interconnect 138 provides an interface between the CSoCs 134 and the NBSC 140. The interconnect 138 may be serial rapid input output (SRIO), peripheral component interconnect express (PCIe), HyperTransport, Ethernet, such as 1/10/40/100 gigabit Ethernet (GE), RapidIO, or another connection between interfaces. In one example, the interconnect 138 includes packetized switches. Alternatively, the interconnect 138 includes circuit switches.

The NBSC 140 controls the bulk storage media 142, n bulk storage media. The NBSC 140 is a logical entity which manages the bulk storage media. The physical implementation of the NBSC 140 may include one or more stand-alone SoC(s) dedicated to managing multiple types of bulk storage media, logical and interface circuitry distributed across multiple CSoCs, and/or a combination of stand-alone SoCs and logical and interface circuitry distributed across multiple CSoCs.

Data is stored in the bulk storage media 142. The bulk storage media 142 may include different types of bulk storage media. In one example, the bulk storage media 142 are all the same type of bulk storage media. The bulk storage media may include volatile memory and/or non-volatile memory. The bulk storage media may be=random access memory (RAM), including static RAM (SRAM) and dynamic RAM (DRAM), such as DDR SDRAM memory, flash memory, such as NAND type flash or NOR type flash, read only memory (ROM), or another bulk storage medium, such as a hard disk drive.

Access to the bulk storage media is driven by SLAs and access requirements. The bulk storage media may be transparent to the controller. Also, a query language might be used to access the bulk storage media.

Figure 4:
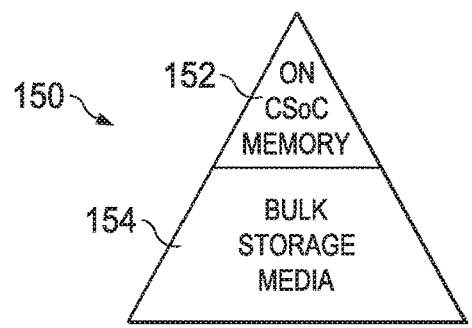
FIG. 4 illustrates a memory pyramid.

FIG. 4 illustrates memory pyramid 150. At the top of memory pyramid 150 is on CSoC memory 152, which includes a relatively small amount of fast memory. At the bottom of memory pyramid 150 is bulk storage media 154, which may be DDR SDRAM, flash memory, a hard drive, or other storage media. There may be a relatively large amount of slow memory. The on CSoC memory is fast, has a high cost, and a low capacity. On the other hand, the bulk storage media, while slower, has a greater capacity and a lower cost. Different memory types may be selected and combined based on cost, access time, and capacity.

Figure 5:
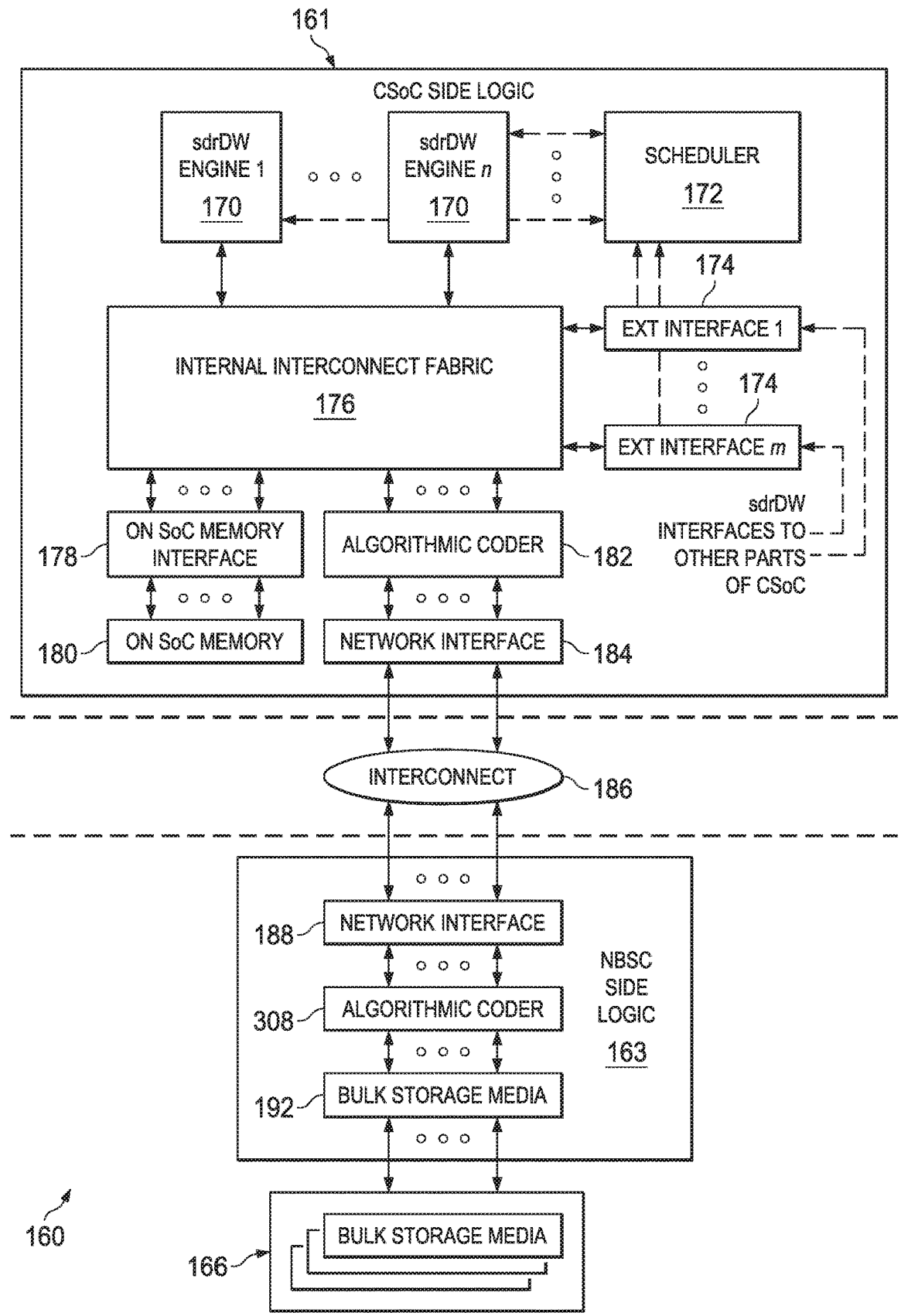
FIG. 5 illustrates another embodiment sdrDW system.

FIG. 5 illustrates the sdrDW 160. The sdrDW 160 includes the CSoC side logic 161, the interconnect 186, the NBSC side logic 163, and the bulk storage media 166. The CSoC side logic 161 may be distributed on multiple CSoCs. Also, the CSoC side logic 161 includes n sdrDW engines 170. In one example, the sdrDW engines 170 are rDW engines. In another example, the sdrDW engines 170 are variations on rDW engines. In an additional example, the sdrDW engines 170 are not rDW engines. The sdrDW engines 170 communicate with the scheduler 172, which performs scheduling for the sdrDW engines 170. The scheduler 172 receives store and query requests via the m external interfaces 174, which interface to other parts of the BB SoC. The scheduler 172 receives store and query requests, and determines the order to perform stores and queries. The sdrDW engines 170 and the external interfaces 174 each communicate with the internal interconnect fabric 176. The internal interconnect fabric 176 interfaces with the on SoC memory interface 178 and the algorithmic coder 182. Additionally, the on SoC memory interface 178 interacts with the on SoC memory 180, which may contain FSS. Also, the algorithmic coder 182 performs algorithmic techniques, such as ECC, compression, decompression, encryption, decryption, and/or other algorithmic coding techniques. In one example, an algorithm combines compression and security, storing some data locally, which is later used for decoding and retrieving original data. Data may be encoded, decoded, encrypted, decrypted, or otherwise processed, before being stored. Also, data retrieved from bulk storage media may be decoded and/or decrypted. The network interface 184 connects the CSoC side logic 161 with the interconnect 186.

The interconnect 186 provides an interface between the CSoC side logic 161 and the NBSC side logic 163. The interconnect 186 may be connected to multiple CSoCs. The interconnect 186 may also be connected to multiple NBSCs. The interconnect 186 may use packet switches or circuit switches, for example PCIe, HyperTransport, Ethernet, or RapidIO.

The NBSC side logic 163 controls the bulk storage media 166. Bulk storage media 166 may include multiple bulk memory media. In one example, bulk storage media are all the same type of memory media. Alternatively, bulk storage media are different types of bulk storage media.

The NBSC side logic 163 communicates with the interconnect 186 using the network interface 188. The algorithmic coder 308 performs algorithmic techniques, such as ECC, compression, decompression, encryption, decryption, and/or other algorithmic coding techniques. Received data to be stored and queried data may be encoded, decoded, compressed, decompressed, or otherwise processed, before transmission through the interconnect 186. The bulk storage media interface 192 directly connects to the bulk storage media 166 to store and query data.

Figure 6:
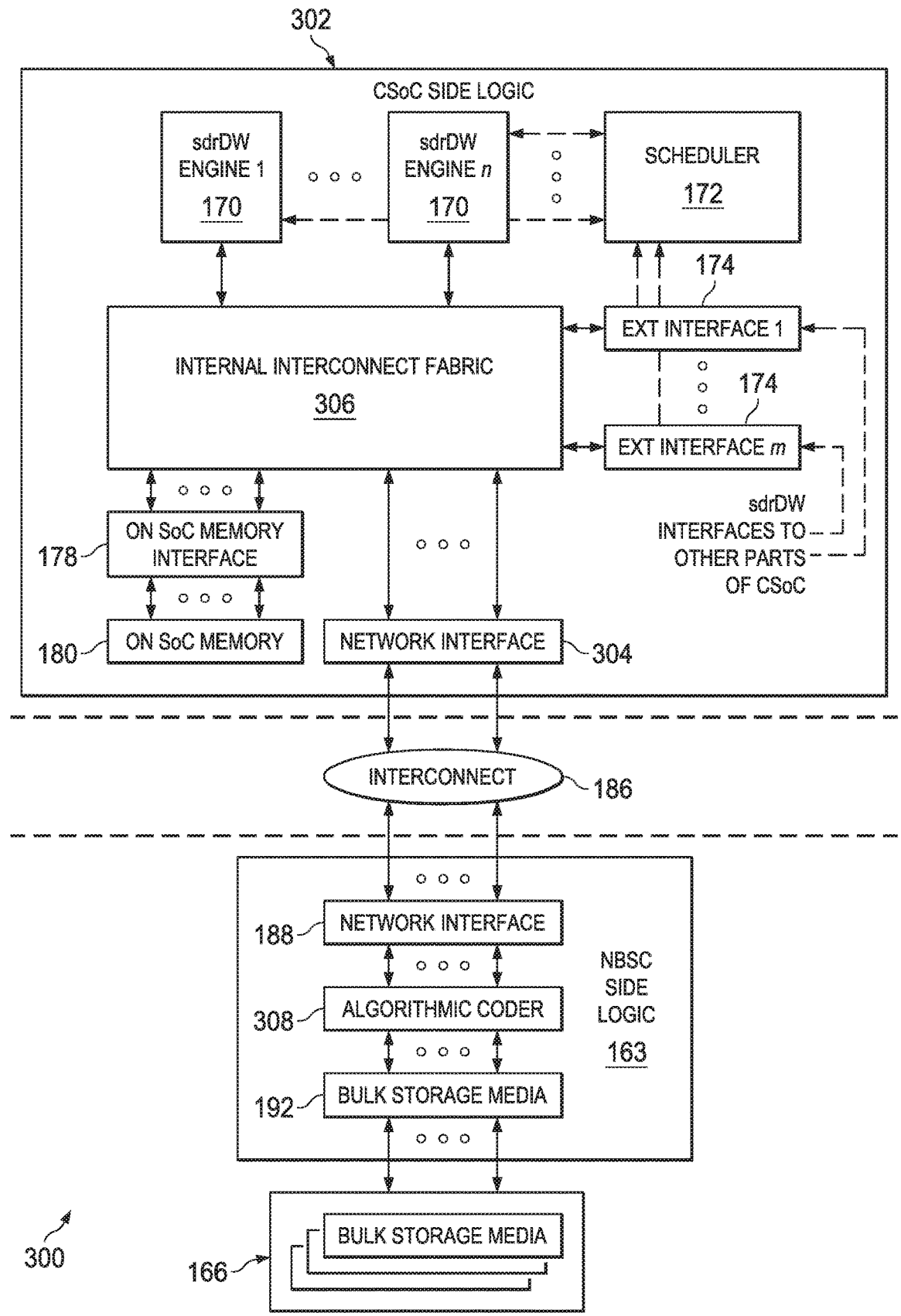
FIG. 6 illustrates another embodiment sdrDW system.

FIG. 6 illustrates the sdrDW 300, which does not include algorithmic coding on the CSoC. The sdrDW 600 includes the CSoC side logic 302, the interconnect 186, the NBSC side logic 163, and the bulk storage media 166. The CSoC side logic 302 may be distributed on multiple CSoCs. The CSoC side logic 302 includes the sdrDW engines 170, n sdrDW engines. The sdrDW engines 170 communicate with the scheduler 172, which performs scheduling for the sdrDW engines 170. The scheduler 172 receives store and query requests via the external interfaces 174, which interface to other parts of the BB SoC. The scheduler 172 receives the store and query requests and decides on the order to perform stores and queries. There are m external interfaces 174. The sdrDW engines 170 and the external interfaces 174 each communicate with the internal interconnect fabric 306. The internal interconnect fabric 306 interfaces with the on SoC memory interface 178 and the network interface 304, which interfaces the CSoC side logic 302 with the interconnect 186.

The interconnect 186 provides an interface between the CSoC side logic 302 and the NBSC side logic 163. The interconnect 186 may be connected to multiple CSoCs. Also, the interconnect 186 may be connected to multiple NBSCs. The interconnect 186 may be packet switches or circuit switches. Examples of the interconnect 186 may include PCIe, HyperTransport, Ethernet, and RapidIO.

The NBSC side logic 163 controls the bulk storage media 166. The bulk storage media 166 may include multiple bulk storage media. In one example, bulk storage media are all the same type of memory media. In another example, bulk storage media includes different types of memory media.

The NBSC side logic 163 communicates with the interconnect 186 using the network interface 188. The algorithmic coder 308 performs algorithmic techniques, such as ECC, compression, decompression, encryption, decryption, and/or algorithmic coding. The bulk storage media interface 192 directly connects to the bulk storage media 166 to store and retrieve data.

Figure 7:
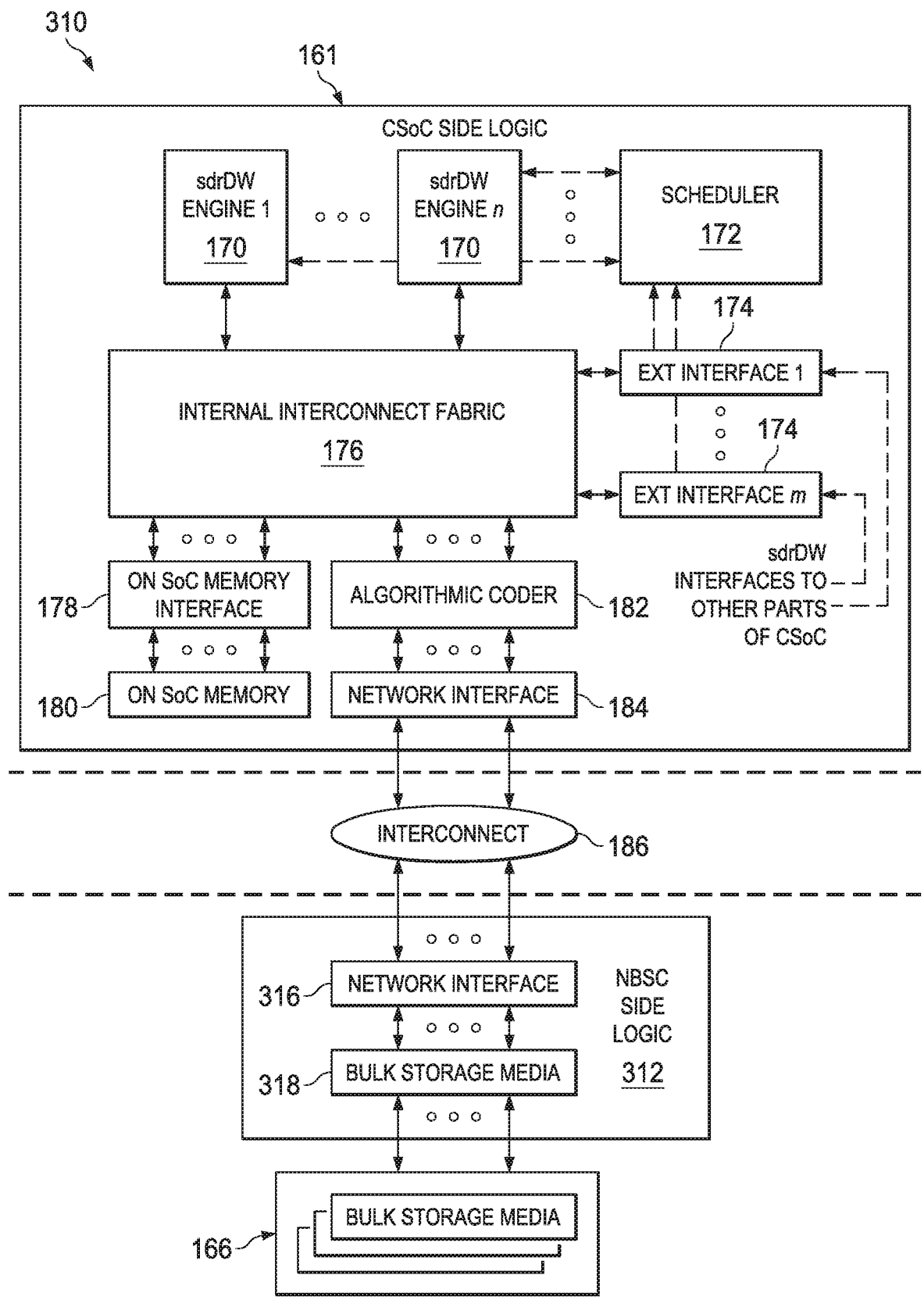
FIG. 7 illustrates an additional embodiment sdrDW system.

FIG. 7 illustrates the sdrDW 310, which does not include algorithmic coding in the NBSC. The sdrDW 310 includes the CSoC side logic 161, the interconnect 186, the NBSC side logic 312, and the bulk storage media 166. The CSoC side logic 161 may be disposed on multiple CSoCs. The CSoC side logic 161 includes the sdrDW engines 170. There are n sdrDW engines 170. The sdrDW engines 170 communicate with the scheduler 172, which performs scheduling for the sdrDW engines 170. The sdrDW engines 170 and the external interfaces 174 each communicate with the internal interconnect fabric 176. The internal interconnect fabric 176 interfaces with the on SoC memory interface 178 and the algorithmic coder 182. The on SoC memory interface 178 interacts with the on SoC memory 180, which may include FSS. The algorithmic coder 182 performs algorithmic techniques, such as ECC, compression, decompression, encryption, decryption, and/or algorithmic coding. Data to be stored in bulk storage media and data retrieved from bulk storage media may be encoded, decoded, encrypted, decrypted, or otherwise processed. Data might be otherwise modified by algorithmic coding technique before transmission to one or more NBSC. The network interface 184 interfaces the CSoC with interconnect 186.

The interconnect 186 provides an interface between the CSoC side logic 161 and the NBSC side logic 312. The interconnect 186 may be connected to multiple CSoCs. Also, the interconnect 186 may be connected to multiple NBSCs. The interconnect 186 may be packet switches or circuit switches, for example PCIe, HyperTransport, Ethernet, or RapidIO.

The NBSC side logic 312 controls the bulk storage media 166. The bulk storage media 166 may include multiple bulk storage media, which may be all the same type of bulk storage medium, or may be different types of bulk storage media.

The NBSC side logic 312 communicates with interconnect 186 using the network interface 316. Bulk storage media interface 318 directly interfaces with bulk storage media 166 to store and retrieve data.

In an additional embodiment, there is no algorithmic coding on either the CSoC or the NBSC.

Figure 8:
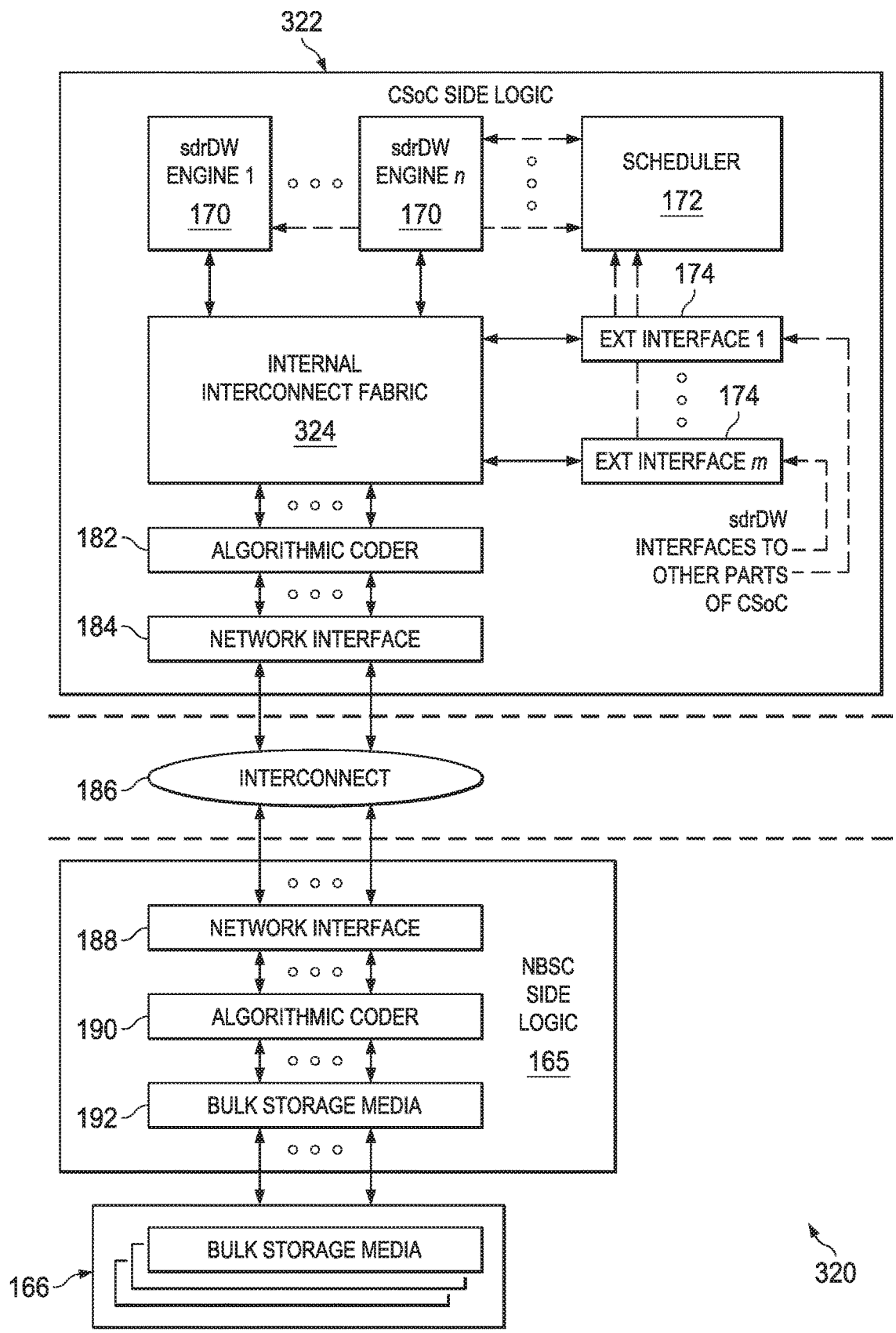
FIG. 8 illustrates another embodiment sdrDW system.

FIG. 8 illustrates the sdrDW 320, which does not contain on SoC memory. The sdrDW 320 includes the CSoC side logic 322, the interconnect 186, the NBSC side logic 165, and the bulk storage media 166. The CSoC side logic 322 may be on multiple CSoCs. The CSoC side logic 322 includes the sdrDW engines 170. The sdrDW engines 170 communicate with scheduler 172, which performs scheduling for the sdrDW engines 170. Additionally, the sdrDW engines 170 and the external interfaces 174 each communicate with the internal interconnect fabric 324. The internal interconnect fabric 324 also interfaces with the algorithmic coder 182, which performs algorithmic techniques, such as ECC, compression, decompression, encryption, decryption, and/or algorithmic coding. The network interface 184 interfaces the CSoC side logic 322 with the interconnect 186.

The interconnect 186 provides an interface between the CSoC side logic 322 and the NBSC side logic 165. The interconnect 186 may be connected to multiple CSoCs, and/or to multiple NBSCs. The interconnect 186 may be packet switches or circuit switches. Examples of the interconnect 186 may include PCIe, HyperTransport, Ethernet, and RapidIO.

The NBSC side logic 165 controls the bulk storage media 166. The bulk storage media 166 may include multiple bulk storage media.

The NBSC side logic 165 communicates with the interconnect 186 using the network interface 188. Also, the algorithmic coder 308 performs algorithmic techniques, such as ECC, compression, decompression, encryption, decryption, and/or algorithmic coding. The bulk storage media interface 192 directly interfaces with the bulk storage media 166 to store and query data.

Figure 9:
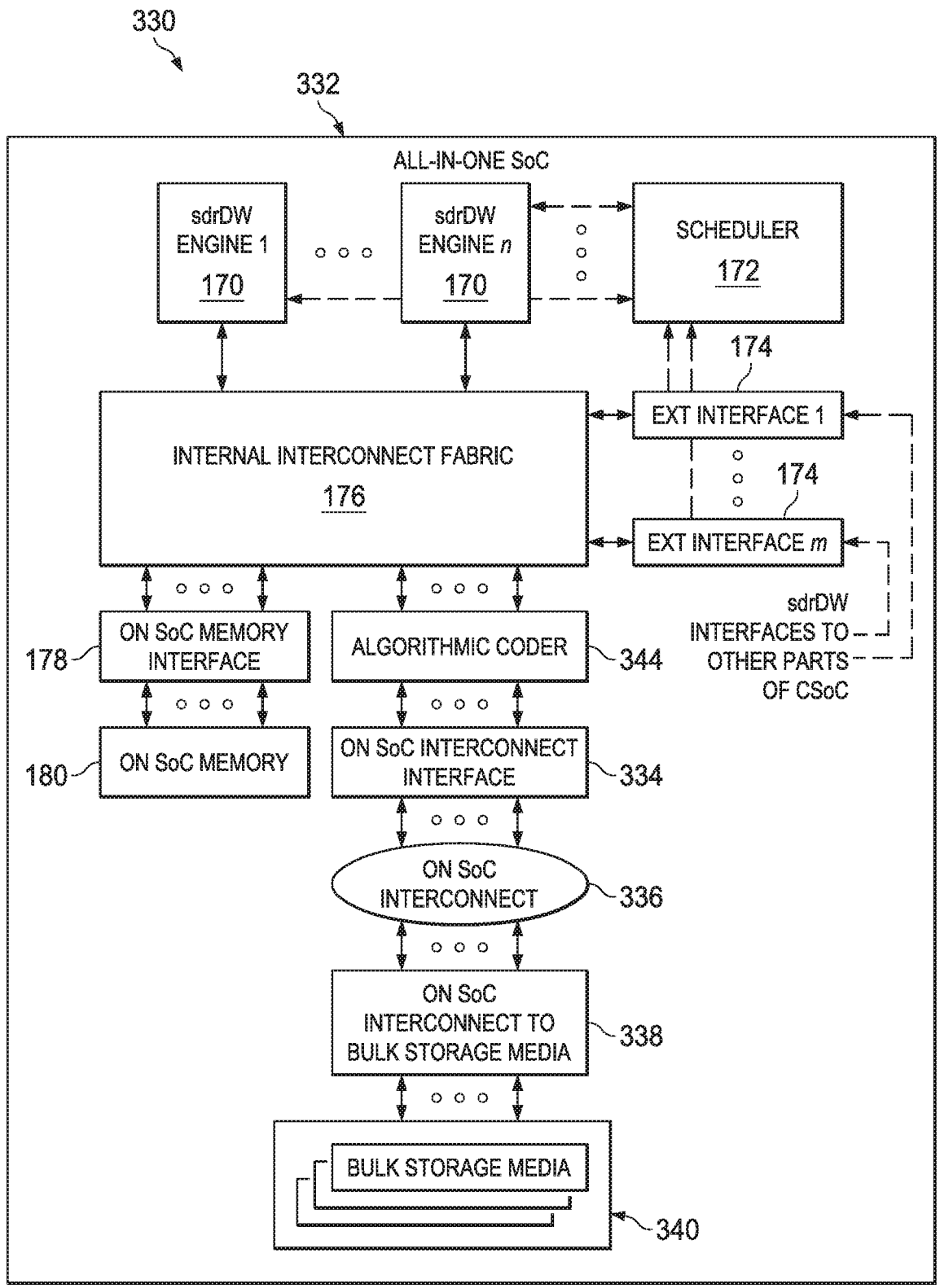
FIG. 9 illustrates an embodiment sdrDW system in an all-in-one system-on-a-chip (SoC)

FIG. 9 illustrates the sdrDW 330, in which the CSoC side logic and the NBSC side logic are integrated on one SoC. The sdrDW 330 includes all-in-one SoC 332, a single SoC which combines the CSoC side logic and the NBSC side logic in one SoC. Although there is a single SoC, there is a decoupling of compute, storage, and interconnect.

There are n sdrDW engines 170. The sdrDW engines 170 communicate with the scheduler 172, which performs scheduling for the sdrDW engines 170. The sdrDW engines 170 and the external interfaces 174 each communicate with the internal interconnect fabric 176. The internal interconnect fabric 176 interfaces with the on SoC memory interface 178 and the algorithmic coder 344. The on SoC memory interface 178 interacts with the on SoC memory 180, which may be FSS. The algorithmic coder 344 performs algorithmic techniques, such as ECC, compression, decompression, encryption, decryption, and/or algorithmic coding. The algorithmic coding techniques may be applied pre-storing or post-retrieving data from bulk storage media. The on SoC interconnect interface 334 interfaces the SoC with the on SoC interconnect 336.

The on SoC interconnect interface 334 interfaces with on SoC interconnect 336. The on SoC interconnect 336 provides an interface between the SoC side logic and the NBSC side logic. The on SoC interconnect 336 may be packet switches or circuit switches. Examples of the on SoC interconnect 336 may be a high speed network between the FSS and bulk storage media, for example PCIe, HyperTransport, Ethernet, and RapidIO. The use of the network improves the constraints on area and power for the SoC and simplifies the board layout.

Data is stored in the bulk storage media 340. In one example, bulk storage media are all the same type of memory medium. Alternatively, bulk storage media are different types of memory media. The bulk storage media may be integrated bulk storage media, such as high bandwidth memory (HBM). The on SoC interconnect to bulk storage media interface 338 controls the bulk storage media 340 based on communications through on SoC interconnect 336.

In one example, multiple CSoCs are connected to one or more NBSC(s) via a network. The sdrDW compresses data and modifies data using compression or other algorithmic coding techniques before transmitting the data to one or more NBSCs. The sdrDW may decompress and/or modify data using algorithmic coding techniques on the data before returning query results to a consumer of data inside one or more CSoCs. The use of algorithmic coding techniques for managing data communication pertinent to multiple CSoCs which are connected to one or more NBSC(s) via a network may reduce the overall network bandwidth, the bandwidth for the NBSC(s), the bulk storage media interface bandwidth, and the total bulk storage media.

Figure 10:
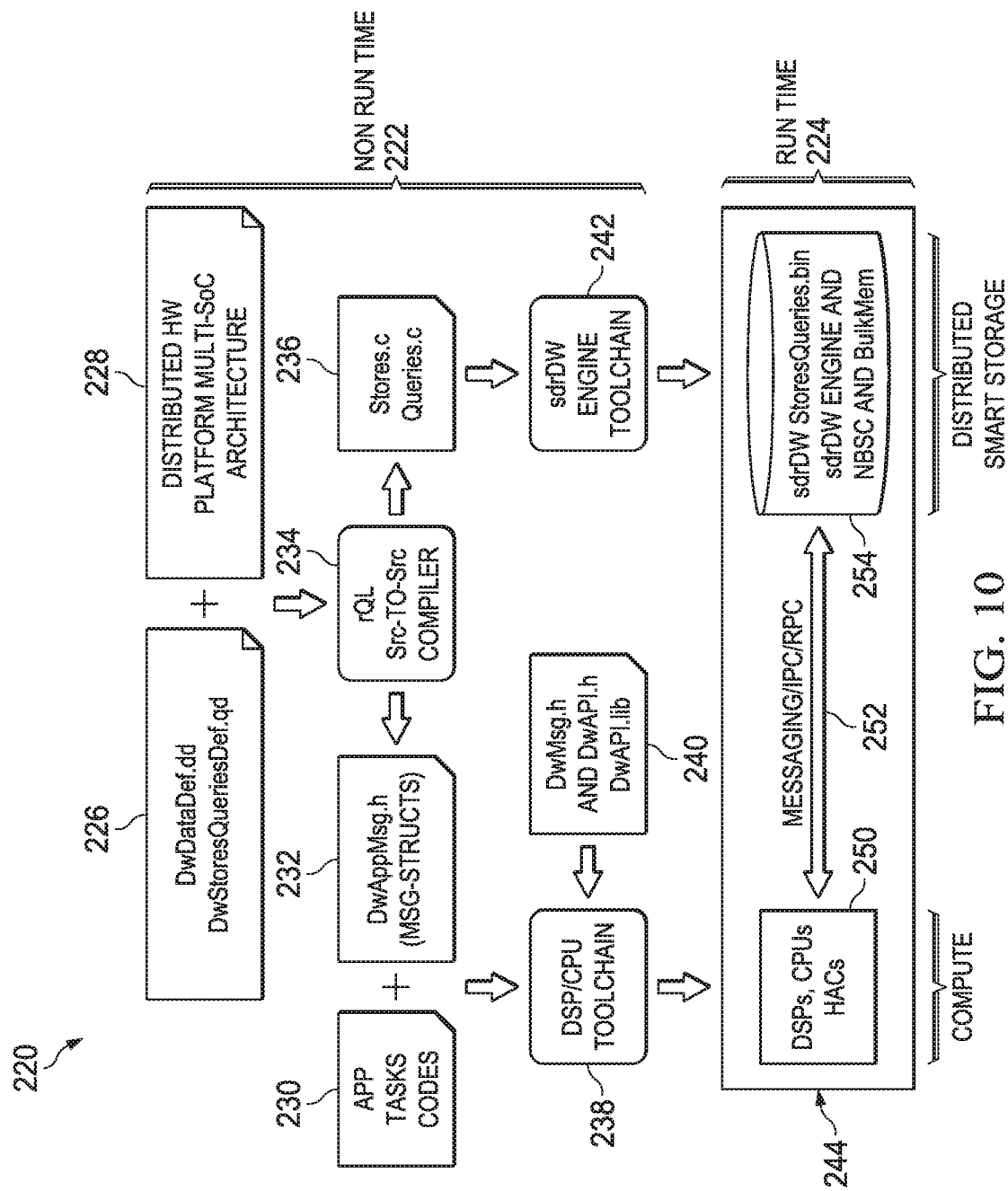
FIG. 10 illustrates an automated infrastructure for an embodiment sdrDW system.

An sdrDW may use a software application programming interface (API), which uses queries and stores for communication between the sdrDW and application code. Query/store implementation is decoupled from application code. Also, data definition and query definition languages and compilers enable the use of the APIs in the application code. The use of compression or other algorithmic coding techniques reduce the volume of data transferred between CSoCs and bulk storage media, which is invisible to the application code. FIG. 10 illustrates automated infrastructure 220 for generating and running code in an sdrDW. Automated infrastructure 220 includes non-run time environment 222, where code is generated before runtime and run time environment 224, where code is executed by one or more sdrDW engines at run time.

Non-run time environment 222 includes data definitions 226 and distributed hardware (HW) platform multi-SoC architecture 228. Data definitions 226 are developed by an application. Data definitions 226 include data warehouse data definitions (DwDataDef.dd) and data warehouse store and query definitions (DwStoresQueriesDef.qd). DWData-Def.dd may include data definitions, which are basic parameters describing the system. The system may be described logically, defining a repository of data objects for that specific system. The data definitions for system parameters may be given by the following code segment, which defines a system with seven parameters and a set of valid ranges which are used to index array elements of the data objects:

An example type overlay is given by the following code segment, which defines types used to define data objects stored within the system's repository:

```
// Sample type overlays
typedef FLOAT SAMPLE_T[2];
template<SystemParamT T>
struct SampleSetT{
    // Define an array of samples dynamically
    // dimensioned by four of the system parameters.
    SAMPLE_T samples[T.SYS_PARAM_1][T.SYS_PARAM_2]
        [T.SYS_PARAM_3][T.SYS_PARAM_7];
};
struct CommonParamTblT { ... };
```

The system data objects may be created dynamically, for example using the following code segment:

```
// System
template<SystemParamT T>
// Data objects dynamically dimensioned by system parameters.
typedef struct {
    CommonParamTblT
    commonParamTbl[T.SYS_PARAM_7][T.SYS_PARAM_1];
    SampleSetT<T>
    sampleSetDb[T.SYS_PARAM_4][T.SYS_PARAM_5]
        [T.SYS_PARAM_6];
} SystemT;
```

Also, sdrDW data objects may be created and initialized, for example using the following code segments:

```
// DW Object CREATION & INITIALIZATION example for
// two unique systems.
DwApi_SystemCreate(SystemT<3,4,100,2,12,7,4>,sys,0);
DwApi_SystemCreate(SystemT<2,2,100,2,12,7,4>,sys,1);
```

The sdrDW provides for the definition of operations to store, update, and query formatted data for data objects created within a system's repository. Examples of these definitions are illustrated below. An example definition which updates a section of a sample database in accordance with the provided indices is:

```
SAMPLE_STORE(UINT16 sysId,
        UINT16 Param1Idx,
        UINT16 Param2Idx,
        SampleSetT<SystemParamT T> Samples)
{
    UPDATE sys[sysId].
        sampleSetDb[PARAM_4_RANGE]
            [PARAM_5_RANGE]
            [PARAM_6_RANGE].
        samples[Param1Idx]
            [Param2Idx]
            [PARAM_3_RANGE]
            [PARAM_7_RANGE]
    WITH Samples.samples[Param1Idx][Param2Idx]
            [PARAM_3_RANGE][PARAM_7_RANGE]
}
```

Another example illustrates a query which selects a portion of the sample database rearranging the indices of the sub-element array to produce a data format conducive to the manner in which the data will be processed:

```
SPECIAL_SAMPLE_QRY (
UINT16 sysId, UINT16 Param4Idx, UINT16 Param5Idx,
UINT16 Param6Idx, UINT16 sampleIdx3List[ ])
{
    SELECT sys[sysId].
            sampleSetDb[Param4Idx]
                      [Param5Idx]
                      [Param6Idx].
            samples[0..10]
                   [PARAM_2_RANGE]
                   [sampleIdx3List]
                   [PARAM_7_RANGE]
    // Returns third index first, first index third
    ORDER BY INDEX
            sys[sysId].sampleSetDb.samples {2, 1, 0, 3}
}
```

Queries may be triggered in a variety of manners. A query may be triggered by any entity. For example, queries may be triggered by a standalone query generator or, a consumer, or an sdrDW engine. In above example, a query is triggered by receiving a query request message. In another example, a query is auto-triggered. An auto-triggered query is defined based on a triggering condition, or data dependencies. For example, when a data item becomes available, a query is automatically triggered. When the triggering condition is satisfied, the query is automatically scheduled for execution. Thus, the result is automatically sent to the consumers who are waiting for the result.

In another example, a WHEN condition is used to specify a triggering condition of an auto-triggered query. Conditions are evaluated each time a store request message related to the query is received. A store request message carries, for example, StoreDef_Id, which may be used to determine other QueryDef_Ids that may depend on this data. An example of an auto-triggered query is given by:

```
SAMPLE_AUTO_TRIGGERED_QUERY ( ){
    SELECT sys[0].
            sampleSetDb[4]
                      [5]
                      [6].
            samples[0..10]
                   [PARAM_2_RANGE]
                   [sampleIdx3List]
                   [PARAM_7_RANGE]
    WHEN sampleIdx3List = 10..15
}
```

Distributed hardware (HW) platform multi-SoC architecture 228 includes hardware definitions for hardware platforms or processors, such as for digital signal processors (DSPs), central processing units (CPUs), hardware accelerators (HACs), and sdrDW engines.

The compiler 234, an rQL source (Src)-to-Src compiler, performs compilation based on the data definitions 226 and distributed hardware platform multi-SoC architecture 228. The definitions are optimized from an abstract language to a general purpose language, such as C/C++, to create a header file. The compiler 234 and tool chain 242 may be combined to yield an integrated compiler which directly generates executable binary code from .dd and .qd, and from hardware platform architecture information. When compiled in binary form, the .h files define data structures which are used by the application programmer to construct a query store request and/or a query/store response. Thus, in this example, the compiler generates both source header files and binary object code. In another embodiment, the header files are defined manually, and the compiler generates transformed source code, or the compiler generates binary code. The compilation optimizes the hardware and software definitions. The compiler 234 produces data warehouse application messaging structure 232 and data warehouse instructions 236.

The data warehouse application messaging structure 232 contains message structures (Msg-Structs) in the file Dw.App.Msg.h. The messaging structure 232 is automatically generated by the compiler 234. The messaging structure is used to develop code for messaging between the sdrDW engine and the sdrDW. The messaging structure may include system related structures and query related types and structures. In one example, the system related structures include the following:

```
// System related structures
typedef enum { SampleSetT_DD_ID = 1,
               CommonParamTblT_DD_ID = 2,
               SpecialParamTblT_DD_ID = 3,
               SystemT_DD_ID = 4, ... } DataDefIdT;
struct SystemParamT {
        UINT8 SYS_PARAM_1;
        UINT8 SYS_PARAM_2;
        UINT8 SYS_PARAM_3;
        UINT8 SYS_PARAM_4;
        UINT8 SYS_PARAM_5;
        UINT8 SYS_PARAM_6;
        UINT8 SYS_PARAM_7;
};
struct CommonParamTblT { ... };
template<SystemParamT T> struct SpecialParamTblT
{ ... };
typedef FLOAT SAMPLE_T[2];
template<SystemParamT T>
struct SampleSetT{
SAMPLE_T samples[T.SYS_PARAM_1]
        [T.SYS_PARAM_2]
        [T.SYS_PARAM_3]
        [T.SYS_PARAM_7];
};
typedef UINT16 SystemIdT;
template<SystemParamT T>
struct SystemT {
        SystemIdT           sysId;
        T                   sysParam;
        CommonParamTblT
commonParamTbl[T.SYS_PARAM_7][T.SYS_PARAM_1];
        SampleSetT<T>  sampleSetDb[T.SYS_PARAM_4]
        [T.SYS_PARAM_5]
        [T.SYS_PARAM_6];
};
```

Also, the query related types and structures may include:

```
// Query related types and structures
typedef enum {
        SPECIAL_SAMPLE_QRY_ID = 1001,
        OTHER_QRY_ID = 1002 } DwQueryIdT;
typedef enum {
        SPECIAL_SAMPLE_QRY_PARAM_DD_ID = 2001,
        OTHER_QRY_PARAM_DD_ID = 2002 } DwQueryParamDataDefIdT;
typedef enum {
        SPECIAL_SAMPLE_QRY_RSLT_DD_ID = 3001,
```

```
    OTHER_QRY_RSLT_DD_ID = 3002 } DwQueryResultDataDefIdT;
struct SPECIAL_SAMPLE_QRY_PARAM_T {
    SystemIdT SysId;
    UINT16 Param4Idx;
    UINT16 Param5Idx;
    UINT16 Param6Idx;
    UINT16 SampleIdx3ListLen;
    UINT16 SampleIdx3List;
};
template <SystemParamT T>
struct SPECIAL_SAMPLE_QRY_RSLT_T {
    // Rearranged indices
    SAMPLE_T SampleResult[T.SYS_PARAM_3]
                         [T.SYS_PARAM_2]
                         [11]
                         [T.SYS_PARAM_7];
};
struct OTHER_QRY_PARAM_T { ... };
template <SystemParamT T>
struct OTHER_QRY_RESULT_T { ... };
typedef union {
    SPECIAL_SAMPLE_QRY_PARAM_T  specialSampleQryP;
    OTHER_QRY_PARAM_T           otherQryP;
    ...
} DW_QUERY_PARAM_T;
// Store related types and structures
typedef enum {
    SAMPLE_STORE_ID = 5001,
    OTHER_STORE_ID = 5002 } DwStoreIdT;
typedef enum {
    SAMPLE_STORE_PARAM_DD_ID = 6001,
    OTHER_PARAM_DD_ID = 6002 } DwStoreParamDataDefIdT;
struct SAMPLE_STORE_PARAM_T {
    SystemIdT SysId;
    UINT16    Param1Idx;
    UINT16    Param2Idx;
    SampleSetT<SystemParamT T> Samples
};
struct COMMON_PARAM_TBL_STORE_PARAM_T { ... };
typedef union {
    SAMPLE_STORE_PARAM_T sampleStoreP;
    OTHER_STORE_PARAM_T  otherStoreP;
    ...
} DW_STORE_PARAM_T;
```

The data warehouse instructions 236 may include binary data warehouse instructions. In one example, the data warehouse instructions are a .dwi file which is a directly executed, binary, non-real time executable file. The data warehouse instructions may be compiled C code, for example from a Stores.c file for storage instructions and a Queries.c file for query instructions. The generated stores file may indicate how the store engine operates. An example of data warehouse storage engine code is given by:

```
DW_Store_Engine( ) {
    MsgReceive(&strMsg);
```

```
    SystemT* pSystem =
            Systems[PARAM(strMsg)->systemId.sysId];
    switch strMsg.storeId {
        case SAMPLE_STORE_ID:
                SAMPLE_STORE(pSystem, strMsg);
                break;
        case OTHER_STORE_ID: ...
        default: ...
```

An example of generated store code is given by:

```
SAMPLE_STORE( SystemT *pSys, StoreMsgT *strMsg )
{
    SAMPLE_T *pSampleData = strMsg->getDataPtr( );
    UINT32 idx1, idx2, idx3, idx4, idx5;
    for (int idx1=0; idx1<pSys->sysParam->SYS_PARAM_4; idx1++)
    {
        for (idx2=0; idx2<pSys->sysParam->SYS_PARAM_5; idx2++)
        {
            for (idx3=0; idx3<pSys->sysParam->SYS_PARAM_6; idx3++)
            {
                for (idx4=0; idx4<pSys->sysParam->SYS_PARAM_3; idx4++)
                {
                    for (idx5=0; idx5<pSys->sysParam->SYS_PARAM_7; idx5++)
```

```
            {
                pSys->sampleSetDB[idx1][idx2][idx3].
                    samples[PARAM(strMsg)->Param1Idx]
                        [PARAM(strMsg)->Param2Idx]
                        [idx4]
                        [idx5] =
                    pSampleData[PARAM(strMsg)->Param1Idx]
                        [PARAM(strMsg)->Param2Idx]
                        [idx4]
                        [idx5];
            } } } } }
}
```

An example data warehouse query engine code is given by:

```
DW_Query_Engine( ) {
    MsgReceive(&qryMsg);
    SystemT* pSystem =
        Systems[PARAM(strMsg)->systemId.sysId];
    switch qryMsg.queryId {
        case SPECIAL_SAMPLE_QRY_ID:
            SPECIAL_SAMPLE_QRY(pSystem, qryMsg);
            break;
        case OTHER_QRY_ID: ...
        default: ...
    }
}
```

Also, an example generated special sample query code is given by:

```
SPECIAL_SAMPLE_QRY( SystemT *pSys, QueryMsg_T *qryMsg ){
    // Allocate result message
    UINT32 payloadSize = PARAM(qryMsg)->SampleIdx3ListLen *
                            pSys->sysParam->SYS_PARAM_2 * 11 *
                            pSys->sysParam->SYS_PARAM_7 *
                            sizeof(SAMPLE_T));
    SPECIAL_TBL_QR_MSG_T *pQryRsltMsg = new
            SPECIAL_TBL_QR_MSG_T(payloadSize);
    SAMPLE_T **pQryRsltData = pQryRsltMsg->getDataPtr( );
    // Locate and aggregate data
    UINT32 idx1, idx2, idx3, idx4;
    for (idx1=0; idx1<PARAM(qryMsg)->SampleIdx3ListLen; idx1++)
    {
        for (idx2=0; idx2<pSys->sysParam->SYS_PARAM_2; idx2++)
        {
            for (idx3=0; idx3<11; idx3++)
            {
                for (idx4=0; idx4<pSys->sysParam->SYS_PARAM_7; idx4++)
                {
                    pQryRsltData[idx1][idx2][idx3][idx4] =
                        pSys->
                            sampleSetDb[PARAM(qryMsg)->Param4Idx]
                                [PARAM(qryMsg)->Param5Idx]
                                [PARAM(qryMsg)->Param5Idx].
                            samples[idx3]
                                [idx2]
                                [PARAM(qryMsg)->SampleIdx3List[idx1]]
                                [idx4];
    } } } }
    // Send response message
    MsgSend(HEADER(qryMsg)->responseChannel,
                pQryRsltMsg->Size( ), pQryRsltMsg);
}
```

An example of generated auto-triggered query code is given by:

```
SAMPLE_AUTO_TRIGGERED_QUERY( SystemT *pSys ){
    UINT32 sampleIdx3List[6] = { 10, 11, 12, 13, 14, 15 };
    // Allocate result message
    UINT32 payloadSize = 6 * pSys->sysParam->SYS_PARAM_2 * 11
                          * pSys->sysParam->SYS_PARAM_7
                          * sizeof(SAMPLE_T));
    SAMPLE_AUTO_TRIGGERED_TBL_QR_MSG_T *pQryRsltMsg = new
            SAMPLE_AUTO_TRIGGERED_TBL_QR_MSG_T(payloadSize);
    SAMPLE_T **pQryRsltData = pQryRsltMsg->getDataPtr( );
    // Locate and aggregate data
    UINT32 idx1, idx2, idx3, idx4;
    for (idx1=0; idx1<6; idx1++)
    {
        for (idx2=0; idx2<pSys->sysParam->SYS_PARAM_2; idx2++)
        {
            for {idx3=0; idx3<11; idx3++)
            {
                for (idx4=0; idx4<pSys->sysParam->SYS_PARAM_7; Idx4++)
                {
                    pQryRsltData[idx1][idx2][idx3][idx4] =
                        pSys->sampleSetDb[4]
                                        [5]
                                        [6].
                                samples[idx3]
                                        [idx2]
                                        [sampleIdx3List[idx1]]
                                        [idx4];
    } } } }
    // Send response message
    MsgSend(HEADER(qryMsg}->responseChannel,
                        pQryRsltMsg->Size( ), pQryRsltMsg);
}
```

The data warehouse instructions 236 are converted into a format used by the sdrDW 254 using sdrDW engine toolchain 242. The files are stored inside the sdrDW for use at runtime.

The application (App) task codes 230 are developed by an application. Data warehouse messaging and data warehouse application programming interface (API) 240 may contain files such as DwMsg.h, DwAPI.h, and DwAPI.lib. DSP/CPU toolchain 238 converts application task codes 230, messaging structure 232, and data warehouse messaging and data warehouse API 240 to forms which may be run on sdrDW engine 250. The files are stored on the sdrDW engine 250 for use at runtime.

Runtime environment 224 includes sdrDW engine 250 and sdrDW 254, which communicate via messaging/inter-process communication (IPC)/remote procedure call (RPC) 252, in runtime environment 244. The rDW engine 250 includes hardware, such as DSPs, CPUs, and HACs.

The sdrDW 254 is a distributed smart storage, and may include StoresQueries.bin, one or more binary files, sdrDW engine(s) such as a CPU and/or sdrDW engine, NBSC, and bulk storage media. The binary file is an executable file stored in memory, which may be run on the sdrDW engine. The sdrDW engine may be embedded into bulk storage media. In another example, the sdrDW engine is separate from the bulk storage media, but located close to the memory. The sdrDW engine receives, processes, and transmits structures with data, where the data has a specialized organization. For example, the sdrDW engine performs stores and queries.

Figure 11:
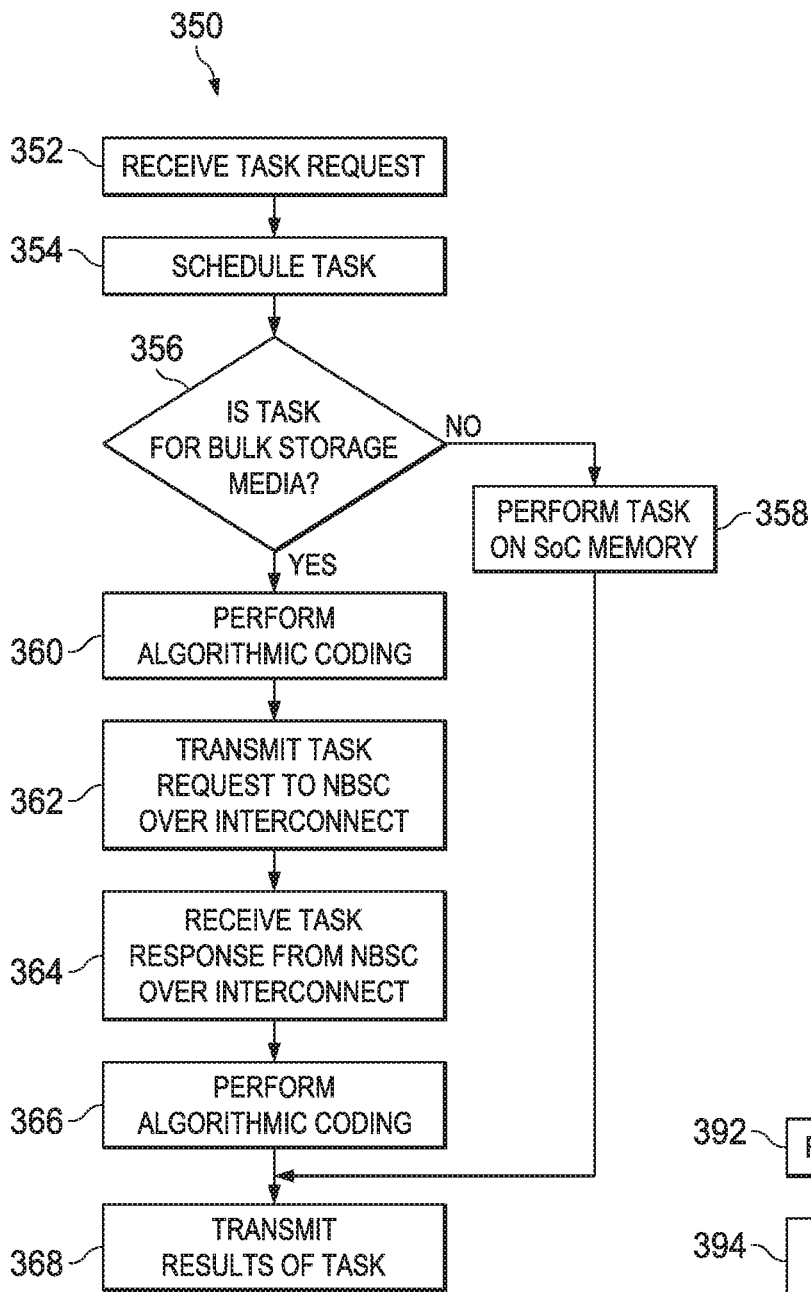
FIG. 11 illustrates a flowchart of an embodiment method of accessing data in an sdrDW performed by a computation system-on-a-chip (CSoC)

FIG. 11 illustrates flowchart 350 for an embodiment method of sdrDW processing performed by sdrDW logic in a CSoC. Initially, in step 352, the sdrDW logic receives a task request, such as a store request or a query request, via an external interface. There may be multiple external interfaces. In one example, the task request is received from other parts of the CSoC. Alternatively, the task request is received from another BB SoC or from another chip or board.

Then, in step 354, the task corresponding to the task request received in step 352 is scheduled. Tasks are scheduled to ensure that queries return data when needed, and that stores are performed before queries which need the stored data.

In step 356, the sdrDW logic determines whether the task is for bulk storage media or for on SoC memory. When the task is for on SoC memory, the sdrDW logic proceeds to step 358. On the other hand, when the task is for bulk storage media, the sdrDW logic proceeds to step 360. In one embodiment, on SoC memory is not used, and all tasks are performed on bulk storage media.

In step 358, the sdrDW logic performs a task upon the on SoC memory. For example, the task is performed on FSS. The sdrDW logic proceeds to step 368.

Algorithmic coding may be performed on data to be stored, or on a query request message, in step 360. Algorithmic techniques, such as ECC, compression, encryption, and/or other algorithmic coding may be performed. In one example, an algorithm combines compression and security, storing some data locally. In some embodiments, algorithmic coding is not performed.

In step 362, the sdrDW logic transmits the task request to an NBSC over an interconnect. The CSoC may be coupled to multiple NBSCs over the interconnect. Also, the interconnect may be connected to multiple NBSCs. The interconnect may be packet switches or circuit switches, for example PCIe, HyperTransport, Ethernet, or RapidIO.

In step 364, the sdrDW logic receives a task response from the NBSC over the interconnect. When a store is performed, the response may be an acknowledgment that the store has been performed. When a query is performed, the response may also include the retrieved data.

In step 366, the sdrDW logic performs algorithmic coding. The algorithmic coding may be performed on data received in step 364 or on a store response. Examples of algorithmic coding include decompression, decryption, and other algorithmic coding. In some examples, step 366 is not performed. The sdrDW logic proceeds to step 368.

In step 368, the sdrDW logic transmits the result of the task to one or more destinations. The destinations may include the task requester, one or more destinations specified by the task requestor or a third party, and/or one or more on CSoC memory areas designated by the task requester or a third party.

Figure 12:
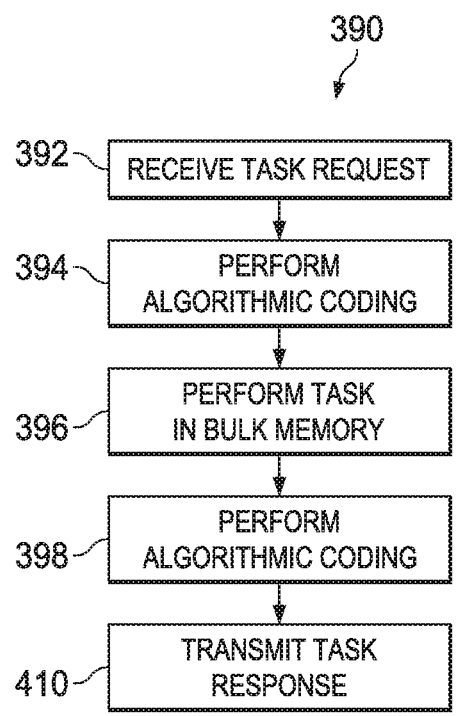
FIG. 12 illustrates a flowchart of an embodiment method of accessing data in an sdrDW performed by a networked bulk storage controller (NBSC)

FIG. 12 illustrates flowchart 390 for an embodiment method of sdrDW processing performed by an NBSC. In step 392, the NBSC receives a task request from a CSoC over an interconnect. The NBSC may receive task request from multiple CSoCs.

In step 394, the NBSC performs algorithmic coding on data to be stored and/or on a task message. Data may, for example, be decoded, decrypted, encoded, encrypted, or otherwise processed. In some examples, algorithmic coding is not performed.

In step 396, a task is performed on bulk storage media based on the task request received in step 392. Data is stored in and/or retrieved from bulk storage media. The data is stored as stored objects in an sdrDW repository. Data may be scattered or spread for storage, as stored objects, in the sdrDW repository. The data does not need to be stored in a two-dimensional (or n-dimensional) table, and may be stored in one or more arbitrarily shaped objects in bulk storage media. Objects produced by a single producer may be stored in different areas of the bulk storage media. In one example, data produced by different producers may be adjacent, but non-overlapping. When a query is performed, objects are read out from stored objects of the sdrDW repository by different consumers. The data which is requested by a particular consumer may originate from different producers. Objects requested by different consumers may overlap in the bulk storage media. Stored objects are gathered and aggregated. Data may be requested in parallel by different consumers. The stored objects which are read out from the sdrDW repository may have an arbitrary format or shape.

In step 398, the NBSC may perform algorithmic coding on data retrieved from bulk storage media and/or on a task response. Data may, for example, be decoded, decrypted, encoded, or encrypted. In some examples, algorithmic coding is not performed.

Then, in step 410, a task response is transmitted to a CSoC over the interconnect. The task response may include an acknowledgment that the task has been successfully performed. When a query is performed, the task response may include data.

Figure 13:
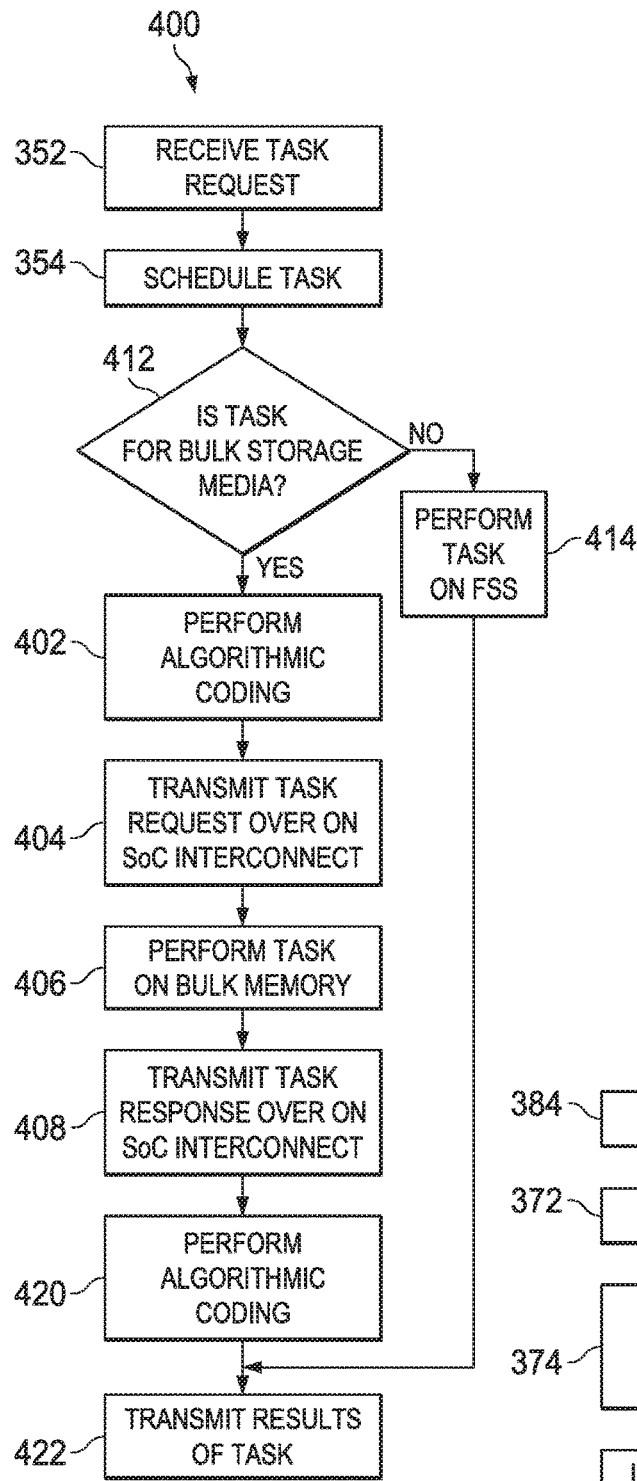
FIG. 13 illustrates a flowchart of an embodiment method of accessing data in an sdrDW performed by an all-in-one SoC.

FIG. 13 illustrates flowchart 400 for an embodiment method of sdrDW processing performed by sdrDW logic in an all-in-one SoC. Initially, in step 352, the sdrDW logic receives a task request via an external interface. There may be multiple external interfaces. The task request may be received from other parts of the SoC, from other SoCs, other chips, or other boards.

In step 354, a task corresponding to the task request received in step 352 is scheduled. Tasks are scheduled to ensure that queries return data when needed, and that stores are performed before queries which need the stored data.

In step 412, the SoC determines whether the task is for bulk storage media or for on SoC memory, including FSS. When the task is for on SoC memory, including FSS, the SoC proceeds to step 358. On the other hand, when the task is for bulk storage media, the SoC proceeds to step 402. In one embodiment, on SoC memory, including FSS is not used, and all stores and queries are performed on bulk storage media.

In step 414, the SoC performs the task on on SoC memory, including FSS. The SoC proceeds to step 422.

In step 402, the SoC performs algorithmic coding. Algorithmic techniques, such as ECC, compression, encryption, and/or other algorithmic coding techniques, may be performed. In some examples, algorithmic coding is not performed.

In step 404, the SoC transmits the task request over on SoC interconnect. On SoC interconnect provides an interface between the SoC side logic and the NBSC side logic. The on SoC interconnect may be packet switches or circuit switches, such as a high speed network between the FSS and bulk storage media, such as PCIe, HyperTransport, Ethernet, or RapidIO.

In step 406, the SoC performs a task on the bulk storage media. The data is stored as stored objects in an sdrDW repository. Data may be scattered or spread for storage, in stored objects in the sdrDW repository. Objects produced by a single producer may be stored in different areas of the bulk storage media. When a query is performed, objects are read out from stored objects of the sdrDW repository which have been requested by different consumers. The data which is requested by a particular consumer may originate from different producers. Objects requested by different consumers may overlap in the bulk storage media. Stored objects are gathered and aggregated. Data may be requested in parallel by different consumers. The stored objects which are read out from the sdrDW repository may have one or more arbitrarily shaped objects in bulk storage media.

In step 408, a task response is transmitted over the on SoC interconnect. The query response may include an acknowledgment the task has been performed successfully. For a query, the query response may also include the queried data.

In step 420, algorithmic coding may be performed. In some examples, algorithmic coding is not performed. The SoC proceeds to step 422.

Figure 14:
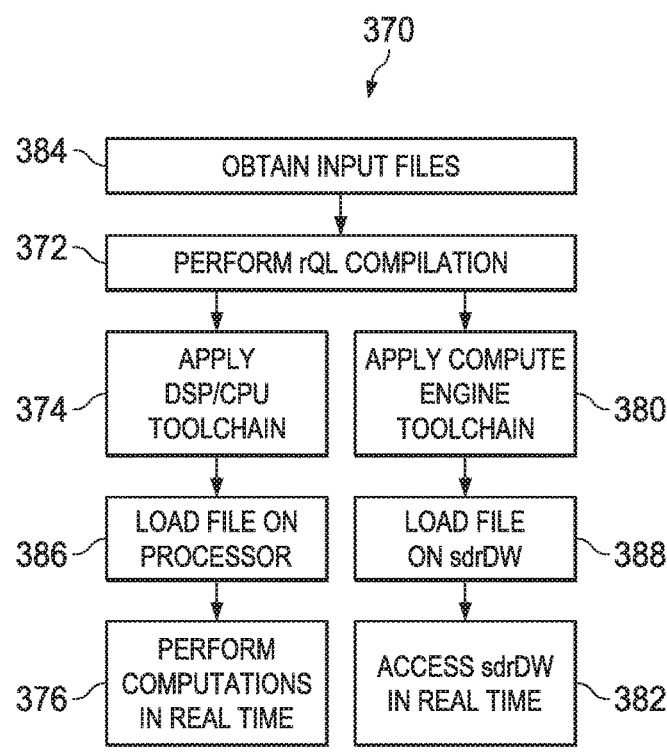
FIG. 14 illustrates a flowchart of an embodiment method of automated code generation for an sdrDW.

In step 422, the sdrDW logic transmits the result of the task to one or more destinations. The destinations may include the task requester, one or more destinations specified by the task requestor or a third party, and/or one or more on CSoC memory areas designated by the task request or a third party FIG. 14 illustrates flowchart 370 for an embodiment method of automatic code generation for sdrDW. In step 384, the sdrDW system obtains input files. For example, the system may obtain data definitions, store definitions, query definitions, hardware platform architecture, application task codes, APIs, and data warehouse messaging files. Some of the files may be produced by applications. Other files are separately developed.

In step 372, the system performs rQL compilation on some of the input files obtained in step 384. The rQL compilation produces optimized and standardized codes. The output code may be in object form or in source form. Hardware and software definitions are used as the inputs for rQL compilations. Software definitions may include data definitions, store definitions, and query definitions. Data definitions are basic parameters which logically describe the content of the sdrDW system, including descriptions of the data formats that may be received from producers and data formats that consumers of sdrDW data may require. Data definitions may be defined more generally, not using a table. For example, a non-relational hierarchical structure may be used. The store and query definitions may be defined and described as formats of data to be stored by producers and to be queried by consumers. Hardware definitions include definitions for various hardware components, such as DSP definitions, CPU definitions, HAC definitions, and DWE definitions. Source-to-source compilation may be performed. In another example, binary compilation is performed. In one example, the definitions are converted from an abstract language to a more common language, such as C/C++, to create a header file. Data warehouse application messaging structures and data warehouse instructions may be produced. The data warehouse instructions may include separate files for stores and queries. Alternatively, the same file is used for stores and queries.

In step 374, a DSP/CPU toolchain is applied. The data warehousing application message structures produced in step 372 and application task codes obtained in step 384 are converted to forms to be directly used by the DSP/CPU engine at run time. Also, data warehousing messaging and data warehousing API files are converted to suitable forms for use by the DSP/CPU engine. The DSP/CPU engine may include hardware, such as DSPs, CPUs, and/or HACs.

Next, in step 386, files produced in step 374 are loaded on processors of the DSP/CPU engine.

Then, in step 376, computations are performed in real time on the DSP/CPU engine. At runtime, the DSP/CPU engine communicates with the sdrDW using defined messages.

In step 380, the DSP/CPU engine toolchain is applied to data warehouse instructions which have been generated in step 380. Step 380 is performed before run time. The instructions are converted to a form to be used by the sdrDW during runtime.

Then, in step 388, the files converted in step 380 are loaded on the sdrDW.

Next, in step 382, the sdrDW is uses the loaded files at run time in real-time. Also, the sdrDW communicates with the DSP/CPU engine using defined messages.

An embodiment sdrDW attempts to satisfy pre-configured SLAs in performing query and store operations requested by other CSoCs or by other parts of an all-in-one SoC. An embodiment sdrDW may handle SLAs which are requested as part of query and store operations. In one example, an sdrDW returns feedback regarding SLAs which could not be satisfied at runtime when the SLAs have been received as part of query and store operations. In an embodiment, the scheduler in the sdrDW may perform feasibility tests for SLAs that the sdrDW is requested to satisfy. The scheduler may also provide feedback about SLAs that cannot be met, as determined by feasibility tests, either at the time of configuration of the sdrDW with SLA information, or when SLAs are received as part of query and store operations.

An embodiment sdrDW has multiple SoCs. An embodiment sdrDW may have multiple bulk storage media controlled by a NBSC. In an embodiment, different types of bulk storage media may be used. Also, an embodiment may have multiple NBSCs. An embodiment sdrDW includes interconnect between SoC(s) and bulk storage media. SoCs, bulk storage media, and interconnect may be modular.

An embodiment eliminates an on CSoC bulk storage interface, such as a DDR interface, which may consume significant area and power. An embodiment leverages a packet network interface for communications between CSoCs and NBSCs. In an embodiment, there is independent evolution of compute, interconnect, and storage. An embodiment enables seamlessly sharing data across multiple CSoCs by centralizing management of bulk storage using a logical NBSC. In an embodiment, the use of compression or other algorithmic coding techniques reduces the volume of data stored in bulk storage and the bandwidth to store or retrieve data for bulk storage. An embodiment leverages interconnect networks, including packet-oriented networks, for communicating between CSoCs and bulk storage, instead of using dedicated on CSoC bulk storage interfaces, such as DDR PHY.

In an embodiment, the layout of board level bulk storage media components, such as DDR and flash chips, are designed and managed independently of the design and board level layout of CSoC. An embodiment simplifies board level constraints, such as air flow. An embodiment provides for SLA guarantees for different categories of data required by CSoCs. In an embodiment, the placement and organization of data in on CSoC memory, including FSS, and off CSoC bulk storage media are hidden behind an API. An embodiment uses compression or other algorithmic coding techniques to reduce the stored data volume and bandwidth for bulk storage media.

Figure 15:
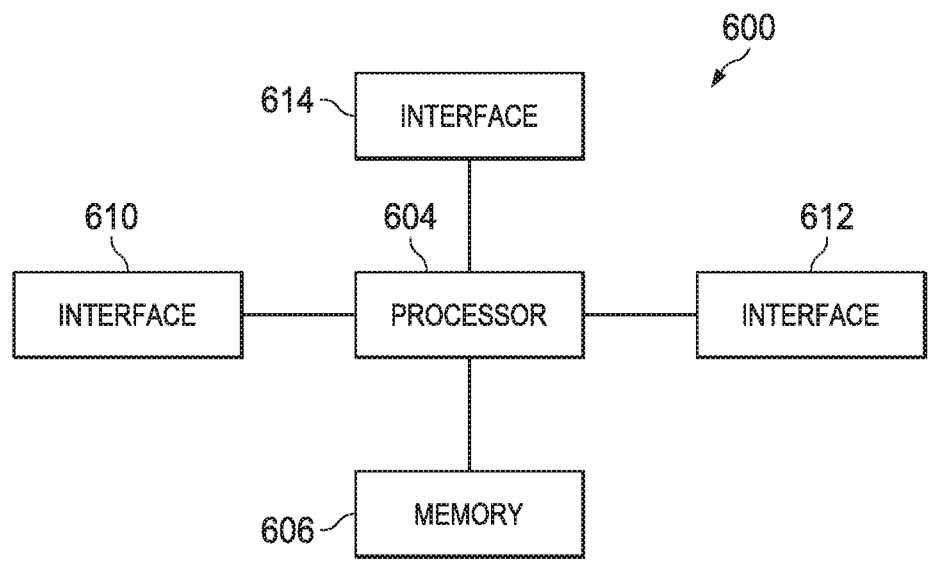
FIG. 15 illustrates a block diagram of an embodiment processing system.

FIG. 15 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 15. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 60o may include additional components not depicted in FIG. 15, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
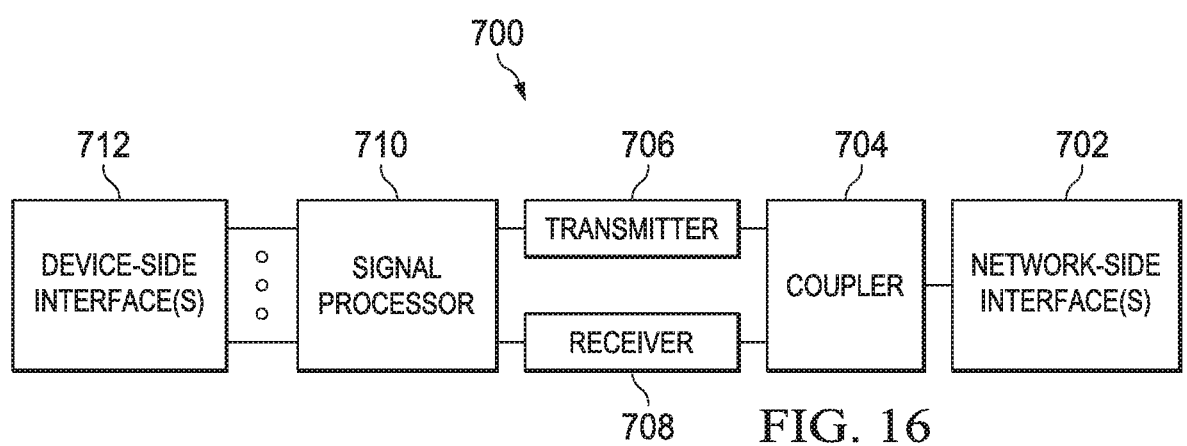
FIG. 16 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 16 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computation system-on-a-chip (CSoC) comprising:
a first scalable distributed real-time Data Warehousing (sdrDW) engine; and
a network interface coupled to the first sdrDW engine and an interconnect, the CSoC configured to transmit a task request over the interconnect to request that a first networked bulk storage controller (NBSC) of a real-time Data Warehouse perform a task on a bulk storage medium, and the first NBSC configured to manage the bulk storage medium without using addresses for locating memory of the bulk storage medium; and
wherein the CSoC further comprises:
an internal interconnect fabric coupled between the first sdrDW engine and the network interface;
a second sdrDW engine coupled to the internal interconnect fabric;
a scheduler coupled to the first sdrDW engine and the second sdrDW engine;
a first external interface coupled to the scheduler and the internal interconnect fabric; and
a second external interface coupled to the scheduler and the internal interconnect fabric.

2. The CSoC of claim 1, wherein the task request is a store request or a query request.

3. The CSoC of claim 1, wherein the interconnect comprises a packet switched connection or a circuit switched connection.

4. The CSoC of claim 1, further comprising:
an on system-on-a-chip (SoC) memory interface coupled to the first sdrDW engine; and
on SoC memory coupled to the on SoC memory interface.

5. The CSoC of claim 1, further comprising an algorithmic coder coupled between the network interface and the first sdrDW engine.

6. The CSoC of claim 1, wherein the CSoC is coupled to a second NBSC via the interconnect.

7. The CSoC of claim 1, further comprising:
an on CSoC interconnect coupled to the network interface, wherein the network interface is an on CSoC interconnect interface; and
a bulk storage medium interface coupling the on CSoC interconnect to the bulk storage medium.

8. The CSoC of claim 1, wherein the network interface is further configured to receive a task response acknowledging that the NBSC performed the on the bulk storage medium.

9. A networked bulk storage controller (NBSC) of a real-time Data Warehouse comprising:
a network interface coupled to an interconnect; and
a bulk storage medium interface coupled to the network interface, the NBSC configured to receive a task request, from a first computation system-on-a-chip (CSoC) over the interconnect, requesting that the NBSC perform a task on a bulk storage medium, and to perform at least a portion of the task on the bulk storage medium in response to receiving the task request from the CSoC without using addresses to locate memory of the bulk storage medium; and wherein the CSoC comprises:
an internal interconnect fabric coupled between a first scalable distributed real-time Data Warehousing (sdrDW) engine and the network interface;
a second sdrDW engine coupled to the internal interconnect fabric;
a scheduler coupled to the first sdrDW engine and the second sdrDW engine;
a first external interface coupled to the scheduler and the internal interconnect fabric; and
a second external interface coupled to the scheduler and the internal interconnect fabric.

10. The NBSC of claim 9, wherein the task is a store or a query.

11. The NBSC of claim 9, wherein the network interface is coupled to a second CSoC over the interconnect.

12. The NBSC of claim 9, wherein the bulk storage medium comprises a first bulk storage medium and a second bulk storage medium.

13. The NBSC of claim 12, wherein the first bulk storage medium is a different type of bulk storage medium than the second bulk storage medium.

14. The NBSC of claim 9, further comprising an algorithmic coder coupled between the network interface and the bulk storage medium interface.

15. A method comprising:
transmitting, by a computation system-on-a-chip (CSoC), a task request to a networked bulk storage controller (NBSC) of a real-time Data Warehouse via an interconnect, the task request requesting that the NBSC perform a task on a bulk storage medium and the NBSC configured to manage the bulk storage medium without using addresses for locating memory of the bulk storage medium; and
receiving, by the CSoC, a task response from the NBSC over the interconnect, the task response being responsive to the task request and acknowledging that the NBSC performed at least a portion of the task on the bulk storage medium; and
wherein the CSoC comprises:
an internal interconnect fabric coupled between a first scalable distributed real-time Data Warehousing (sdrDW) engine of the CSoC and a network interface;
a second sdrDW engine coupled to the internal interconnect fabric;
a scheduler coupled to the first sdrDW engine and the second sdrDW engine;
a first external interface coupled to the scheduler and the internal interconnect fabric; and
a second external interface coupled to the scheduler and the internal interconnect fabric.

16. The method of claim 15, further comprising performing algorithmic coding on data accessed in performing the task to produce coded data.

17. The method of claim 16, wherein performing the algorithmic coding on the data comprises performing compression or encryption on the data to produce compressed or encrypted data.

18. The method of claim 16, wherein performing the algorithmic coding on the data comprises performing decompression or decryption on compressed or encrypted data to produce decompressed or unencrypted data.

19. The method of claim 15, wherein at least a first portion of the task is performed by an sdrDW on system-on-a-chip (SoC) memory of the CSoC, the sdrDW beginning to perform the first portion of the task on the SoC memory prior to the task request being transmitted to the NBSC, and wherein the task response indicates that the NBSC performed at least a second portion of the task on off SoC memory of the bulk storage medium.

20. The method of claim 19, wherein the task request is distributed over multiple interconnects to request that each different NBSCs perform different portions of the task on different distributed off SoC memory locations.

21. The method of claim 20, wherein the different distributed off SoC memory locations are located on a same bulk storage medium.

22. The method of claim 20, wherein the different distributed off SoC memory locations are located on different bulk storage medium.

23. The method of claim 20, further comprising:
receiving multiple task responses from the different NBSCs that include data associated with the respective different portions of the task.

24. The method of claim 23, further comprising:
aggregating the data included in the multiple task responses with local data obtained from performing the first portion of the task on the SoC memory; and
performing a computation based on the aggregated data.

25. The NBSC of claim 9, wherein at least a first portion of the task is performed by an scalable distributed real-time Data Warehousing (sdrDW) engine on system-on-a-chip (SoC) memory of the CSoC, the sdrDW engine beginning to perform the first portion of the task on the SoC memory prior to the task request being transmitted to the NBSC, and wherein the NBSC is further configured to send a task response to the sdrDW engine indicating that at least a second portion of the task has been performed on off SoC memory of the bulk storage medium.

26. The CSoC of claim 1, wherein the first sdrDW engine is configured to perform operations of:
performing at least a first portion of the task on system-on-a-chip (SoC) memory, the first sdrDW engine beginning to perform the first portion of the task on the SoC memory prior to transmitting the task request over the interconnect to the NBSC; and
receiving a task response from the NBSC indicating that at least a second portion of the task has been performed on off SoC memory of the bulk storage medium.

27. The CSoC of claim 26, wherein the network interface is coupled to multiple interconnects associated with different NBSCs including the NBSC, and wherein the task request is distributed over the multiple interconnects to request that each of the different NBSCs perform different portions of the task on different distributed off SoC memory locations.

28. The CSoC of claim 27, wherein the different distributed off SoC memory locations are located on the same bulk storage medium.

29. The CSoC of claim 27, wherein the different distributed off SoC memory locations are located on different bulk storage medium.

30. The CSoC of claim 27, wherein the CSoC is further configured to receive multiple task responses from the different NBSCs that include data associated with the respective different portions of the task.

31. The CSoC of claim 30, wherein the CSoC is further configured to aggregate the data included in the multiple task responses with local data obtained from performing the first portion of the task on the SoC memory and to perform a computation based on the aggregated data.

* * * * *